(12) United States Patent
Yamamoto et al.

(10) Patent No.: US 12,434,706 B2
(45) Date of Patent: *Oct. 7, 2025

(54) VEHICLE PLATFORM, AUTONOMOUS DRIVING SYSTEM, AND VEHICLE CONTROL INTERFACE BOX

(71) Applicant: TOYOTA JIDOSHA KABUSHIKI KAISHA, Toyota (JP)

(72) Inventors: Yusuke Yamamoto, Toyota (JP); Toshikazu Hioki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

This patent is subject to a terminal disclaimer.

(21) Appl. No.: 17/944,234

(22) Filed: Sep. 14, 2022

(65) Prior Publication Data

US 2023/0110042 A1    Apr. 13, 2023

(30) Foreign Application Priority Data

Sep. 28, 2021  (JP) .................................. 2021-157685

(51) Int. Cl.
| | |
|---|---|
| *B60W 30/00* | (2006.01) |
| *B60W 10/26* | (2006.01) |
| *B60W 30/182* | (2020.01) |
| *B60W 60/00* | (2020.01) |

(52) U.S. Cl.
CPC .......... *B60W 30/182* (2013.01); *B60W 10/26* (2013.01); *B60W 60/001* (2020.02)

(58) Field of Classification Search
CPC ... B60W 30/182; B60W 60/001; B60W 10/26

USPC .......................................................... 701/22
See application file for complete search history.

(56) References Cited

U.S. PATENT DOCUMENTS

| | | |
|---|---|---|
| 9,050,540 B1 | 6/2015 | Norman et al. |
| 9,162,153 B1 | 10/2015 | Mimlitch, III et al. |
| 9,580,080 B1 | 2/2017 | Letwin et al. |
| 10,339,400 B1 | 7/2019 | Chai et al. |
| 2014/0047073 A1 | 2/2014 | Beme |
| 2016/0114792 A1* | 4/2016 | Gibson ............... B60W 40/105 180/65.265 |
| 2018/0162230 A1 | 6/2018 | Kamachi et al. |

(Continued)

FOREIGN PATENT DOCUMENTS

| | | |
|---|---|---|
| CN | 106143491 A | 11/2016 |
| CN | 109229036 A | 1/2019 |

(Continued)

OTHER PUBLICATIONS

Aug. 23, 2022 Office Action issued in U.S. Appl. No. 17/722,784.

(Continued)

*Primary Examiner* — Adnan M Mirza
(74) *Attorney, Agent, or Firm* — Oliff PLC

(57) ABSTRACT

A VP includes a base vehicle and a VCIB. The VCIB interfaces between the VP and an ADS. The VCIB is configured to receive a power mode command that requests control of a power mode of the VP from the ADS. The power mode includes a sleep mode in which a vehicle power is in an off condition, a wake mode in which the VCIB is awake, an ignition on mode in which the vehicle is in an ignition on state, and a drive mode in which the vehicle power is in an on condition.

11 Claims, 15 Drawing Sheets

(56) References Cited

U.S. PATENT DOCUMENTS

| | | |
|---|---|---|
| 2018/0281597 A1 | 10/2018 | Herb |
| 2019/0084425 A1 | 3/2019 | Liu et al. |
| 2019/0118792 A1 | 4/2019 | Malone et al. |
| 2019/0283239 A1 | 9/2019 | Skaaksrud et al. |
| 2019/0300008 A1 | 10/2019 | Ando |
| 2019/0383239 A1 | 12/2019 | Dudar |
| 2020/0223376 A1* | 7/2020 | Tillman ............... B60R 16/023 |
| 2020/0242924 A1 | 7/2020 | Publicover et al. |
| 2020/0264634 A1 | 8/2020 | Hadi et al. |
| 2020/0377055 A1 | 12/2020 | Ando |
| 2021/0025365 A1* | 1/2021 | Niu .................. B60L 58/12 |
| 2021/0086761 A1 | 3/2021 | El Assaad et al. |
| 2021/0188295 A1 | 6/2021 | Hirashima |
| 2021/0237765 A1 | 8/2021 | Ando |
| 2022/0250647 A1 | 8/2022 | Ando |

FOREIGN PATENT DOCUMENTS

| | | |
|---|---|---|
| CN | 110647283 A | 1/2020 |
| CN | 112026521 A | 12/2020 |
| DE | 10 2004 007 721 A9 | 5/2005 |
| JP | 2009-101843 A | 5/2009 |
| JP | 2013-3976 A | 1/2013 |
| JP | 2013-238480 A | 11/2013 |
| JP | 2016-179786 A | 10/2016 |
| JP | 2018-98844 A | 6/2018 |
| JP | 2018-132015 A | 8/2018 |
| JP | 2019-177807 A | 10/2019 |
| JP | 2021-123135 A | 8/2021 |
| WO | 2009/053837 A2 | 4/2009 |
| WO | 2019/068175 A1 | 4/2019 |

OTHER PUBLICATIONS

Sep. 6, 2022 Office Action issued in U.S. Appl. No. 17/136,114.
Jan. 13, 2023 Office Action issued in U.S. Appl. No. 17/722,784.
Jul. 18, 2023 Office Action issued in U.S. Appl. No. 17/722,784.
Nov. 17, 2023 Office Action issued in U.S. Appl. No. 17/722,784.
Mar. 13, 2024 Advisory Action issued in U.S. Appl. No. 17/722,784.
Mar. 27, 2024 Office Action issued in U.S. Appl. No. 17/722,784.
Hua Hua, "Electric Vehicles", China Communications Press, 1st edition, Jan. 2003, p. 60.
Meiduo, "New Energy Vehicle Technology", Southwest Jiaotong University Press, 1st edition, Apr. 2017, p. 41.
Jiang Zheng, "Multi-layer and Multi-cell Collaboration Technology for 5G", Beijing University of Posts and Telecommunications Press, 1st edition, Aug. 2017, p. 210.
Translation of Jun. 24, 2024 Office Action issued in Chinese Patent Application No. 202110103408.1.

* cited by examiner

<Power Mode Command>

| Value | Description | Remarks |
|---|---|---|
| 0 | No request | |
| 1 | Sleep | Turns OFF the vehicle |
| 2 | Wake | Turns ON VCIB |
| 3 | Reserved | |
| 4 | Reserved | |
| 5 | Ignition ON | means "Ignition ON" as the power mode which the vehicle has |
| 6 | Drive | Turns ON the vehicle |

FIG.6

<Power Mode Status>

| Value | Description | Remarks |
|---|---|---|
| 0 | Reserved | |
| 1 | Sleep | |
| 2 | Wake | |
| 3 | Reserved | |
| 4 | Reserved | |
| 5 | Ignition ON | |
| 6 | Drive | |
| 7 | unknown | means unhealthy situation would occur |

FIG.11

| | |
|---|---|
| #1: CREATING A DRIVING PLAN | THE ADS CREATES A DRIVING PLAN. |
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |

VEHICLE PLATFORM, AUTONOMOUS DRIVING SYSTEM, AND VEHICLE CONTROL INTERFACE BOX

This nonprovisional application is based on Japanese Patent Application No. 2021-157685 filed with the Japan Patent Office on Sep. 28, 2021, the entire contents of which are hereby incorporated by reference.

BACKGROUND

Field

The present disclosure relates to a vehicle platform configured such that an autonomous driving system is mountable thereon, an autonomous driving system configured as being mountable on a vehicle platform, and a vehicle control interface box that interfaces between a vehicle platform and an autonomous driving system mounted on the vehicle platform.

Description of the Background Art

Japanese Patent Laying-Open No. 2018-132015 discloses a vehicle incorporating an autonomous driving system. The vehicle incorporates a motive power system, a power supply system, and the autonomous driving system. The motive power system manages motive power of the vehicle in a centralized manner. The power supply system manages charging and discharging power of a battery mounted on the vehicle or supply of electric power to various vehicle-mounted devices in a centralized manner. The autonomous driving system carries out autonomous driving control of the vehicle in a centralized manner. An engine ECU of the motive power system, a power supply ECU of the power supply system, and an autonomous driving ECU of the autonomous driving system are communicatively connected to one another over a vehicle-mounted network.

An autonomous driving system developed by an autonomous driving system developer may externally be attached to a vehicle. In this case, autonomous driving is carried out under vehicle control in accordance with a command from the externally attached autonomous driving system.

In such a vehicle, an interface for various commands and signals exchanged between the externally attached autonomous driving system and the vehicle is important. When the externally attached autonomous driving system carries out autonomous driving, how to control a power supply on a vehicle side from the autonomous driving system is also important. Japanese Patent Laying-Open No. 2018-132015 does not particularly discuss such an aspect.

SUMMARY

The present disclosure was made to solve such a problem, and an object of the present disclosure is to be able to control from an autonomous driving system, a power mode of a vehicle platform on which the autonomous driving system is mounted.

Another object of the present disclosure is to be able to control a power mode of a vehicle platform from an autonomous driving system mounted on the vehicle platform.

Another object of the present disclosure is to be able to control a power mode of a vehicle platform from an autonomous driving system through a vehicle control interface box that interfaces between the vehicle platform and the autonomous driving system mounted on the vehicle platform.

A vehicle platform in the present disclosure is a vehicle platform (VP) on which an autonomous driving system (ADS, ADK) is mountable, and it includes a vehicle and a vehicle control interface box (VCM) that interfaces between the vehicle and the autonomous driving system. The vehicle control interface box is configured to receive a power mode command from the autonomous driving system, the power mode command requesting control of a power mode of the vehicle platform. The power mode includes a sleep mode (Sleep) in which a vehicle power is in an off condition, a wake mode (Wake) in which the vehicle control interface box is awake, an ignition on mode (Ignition ON) in which the vehicle is in an ignition on state, and a drive mode (Drive) in which the vehicle power is in an on condition.

In this vehicle platform, there are four power modes of the sleep mode, the wake mode, the ignition on mode, and the drive mode. The vehicle control interface box receives the power mode command that requests control of the power mode from the autonomous driving system. Therefore, according to the vehicle platform, the four power modes of the vehicle platform can be controlled from the autonomous driving system through the vehicle control interface box.

The vehicle platform may include a main battery and an auxiliary battery. The wake mode may be a mode in which the vehicle control interface box is awake by power feed from the auxiliary battery without power feed from the main battery.

According to the vehicle platform, the wake mode in which the vehicle control interface box is awake by power feed from the auxiliary battery without power feed from the main battery can be set from the autonomous driving system through the vehicle control interface box.

The vehicle may further include a plurality of electronic control units. The ignition on mode may be a mode in which a larger number of electronic control units among the plurality of electronic control units are awake than in the wake mode, by power feed from the auxiliary battery without power feed from the main battery.

According to this vehicle platform, the ignition on mode in which a larger number of electronic control units than in the wake mode are awake by power feed from the auxiliary battery without power feed from the main battery can be set from the autonomous driving system through the vehicle control interface box.

The power mode may be such that, from the sleep mode, transition to the wake mode can be made, from the wake mode, transition to any one of the sleep mode, the ignition on mode, and the drive mode can be made, from the ignition on mode, transition to any one of the sleep mode, the wake mode, and the drive mode can be made, and from the drive mode, transition to any one of the sleep mode and the wake mode can be made.

The vehicle control interface box may be configured to ignore a request for transition from the drive mode to the ignition on mode.

According to the configuration as above, transition to the drive mode is made via the wake mode. Therefore, the vehicle power supply is not turned on while the vehicle control interface box that interfaces between the vehicle and the autonomous driving system is not awake. Therefore, the vehicle can be prevented from becoming able to travel without the vehicle and the autonomous driving system being interfaced with each other.

The vehicle control interface box may further be configured to transmit a power mode status indicating a status of the power mode of the vehicle platform to the autonomous driving system.

According to such a configuration, the autonomous driving system can recognize a status of the power mode of the vehicle platform and can carry out appropriate control in accordance with each mode.

An autonomous driving system in the present disclosure is an autonomous driving system (ADS, ADK) configured as being mountable on a vehicle platform (VP). The vehicle platform includes a vehicle and a vehicle control interface box (VCIB) that interfaces between the vehicle and the autonomous driving system. The autonomous driving system includes a compute assembly and a communication module that communicates with the vehicle control interface box. The compute assembly is programmed to transmit a power mode command that requests control of a power mode of the vehicle platform to the vehicle control interface box through the communication module. The power mode includes a sleep mode (Sleep) in which a vehicle power is in an off condition, a wake mode (Wake) in which the vehicle control interface box is awake, an ignition on mode (Ignition ON) in which the vehicle is in an ignition on state, and a drive mode (Drive) in which the vehicle power is in an on condition.

According to this autonomous driving system, the four power modes of the vehicle platform can be controlled from the autonomous driving system through the vehicle control interface box.

The compute assembly may further be programmed to receive a power mode status indicating a status of the power mode of the vehicle platform from the vehicle control interface box through the communication module.

This autonomous driving system can recognize a status of the power mode of the vehicle platform and can carry out appropriate control in accordance with each mode.

A vehicle control interface box in the present disclosure is a vehicle control interface box (VCIB) that interfaces between a vehicle platform (VP) and an autonomous driving system (ADS, ADK) mounted on the vehicle platform, and includes a processor and a memory in which a program executed by the processor is stored. The processor receives a power mode command that requests control of a power mode of the vehicle platform from the autonomous driving system in accordance with the program. The power mode includes a sleep mode (Sleep) in which a vehicle power is in an off condition, a wake mode (Wake) in which the vehicle control interface box is awake, an ignition on mode (Ignition ON) in which a vehicle is in an ignition on state, and a drive mode (Drive) in which the vehicle power is in an on condition.

According to this vehicle control interface box, the four power modes of the vehicle platform can be controlled from the autonomous driving system through the vehicle control interface box.

The processor may ignore a request for transition from the drive mode to the ignition on mode.

Thus, transition to the drive mode is made via the wake mode. Therefore, a vehicle power supply is not turned on while the vehicle control interface box is not awake. Therefore, the vehicle can be prevented from becoming able to travel without the vehicle and the autonomous driving system being interfaced with each other.

The processor may further transmit a power mode status indicating a status of the power mode of the vehicle platform to the autonomous driving system.

According to this vehicle control interface box, the autonomous driving system can recognize a status of the power mode of the vehicle platform and can carry out appropriate control in accordance with each mode.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram showing a power mode status signal outputted from the VCIB to the ADS.

FIG. 11 is a diagram showing a typical workflow in the ADS.

DESCRIPTION OF THE PREFERRED EMBODIMENTS

Figure 1:
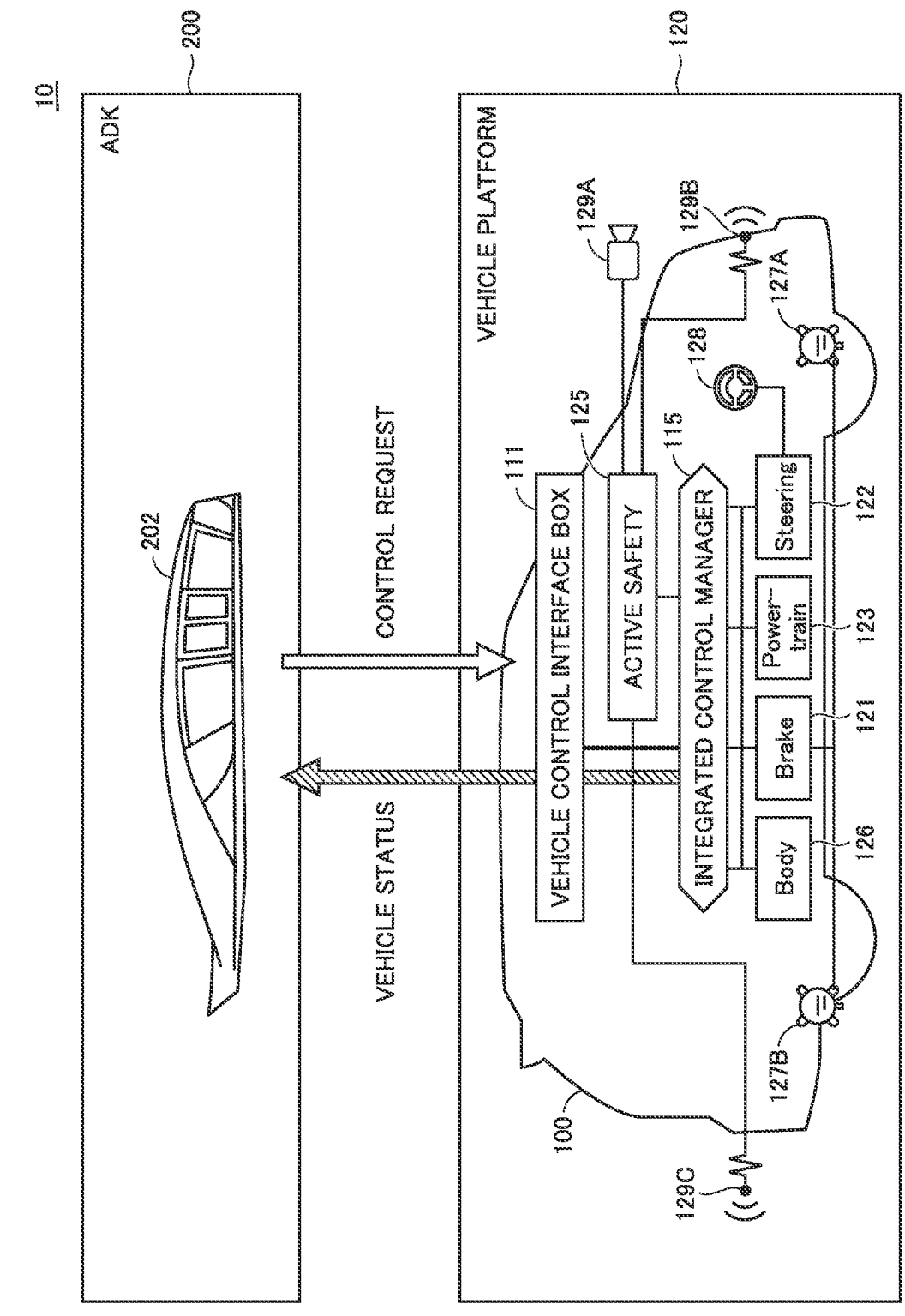
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

FIG. 1 is a diagram showing overview of a vehicle 10 according to an embodiment of the present disclosure. Referring to FIG. 1, vehicle 10 includes an autonomous driving kit (which is denoted as "ADK" below) 200 and a vehicle platform (which is denoted as "VP" below) 120. ADK 200 is configured as being attachable to (mountable on) VP 120. ADK 200 and VP 120 are configured to communicate with each other through a vehicle control interface box 111 (which will be described later) mounted on VP 120.

VP 120 can carry out autonomous driving in accordance with control requests (commands) from ADK 200. Though FIG. 1 shows VP 120 and ADK 200 at positions distant from each other, ADK 200 is actually attached to a rooftop or the like of a base vehicle 100 (which will be described later) included in VP 120. ADK 200 can also be removed from VP 120. While ADK 200 is not attached, VP 120 can travel by driving by a user. In this case, VP 120 carries out travel control (travel control in accordance with an operation by a user) in a manual mode.

ADK 200 includes an autonomous driving system (which is denoted as "ADS" below) 202 for autonomous driving of vehicle 10. For example, ADS 202 creates a driving plan of vehicle 10. Then, ADS 202 outputs various commands (control requests) for travel of vehicle 10 in accordance with the created driving plan to VP 120 in accordance with an application program interface (API) defined for each command. ADS 202 receives various signals indicating statuses (vehicle statuses) of VP 120 from VP 120 in accordance with the API defined for each signal. Then, ADS 202 has the received vehicle status reflected on creation of the driving plan. A detailed configuration of ADS 202 will be described later.

VP 120 includes base vehicle 100 and vehicle control interface box (which is denoted as "VCIB" below) 111.

Base vehicle 100 carries out various types of vehicle control in accordance with a control request from ADK 200 (ADS 202). Base vehicle 100 includes various systems and various sensors for controlling the vehicle. Specifically, base vehicle 100 includes an integrated control manager 115, a brake system 121, a steering system 122, a powertrain system 123, an active safety system 125, a body system 126, wheel speed sensors 127A and 127B, a pinion angle sensor 128, a camera 129A, and radar sensors 129B and 129C.

Integrated control manager 115 includes a processor and a memory, and integrally controls the systems (brake system 121, steering system 122, powertrain system 123, active safety system 125, and body system 126) involved with operations of the vehicle.

Brake system 121 is configured to control a braking apparatus provided in each wheel. The braking apparatus includes, for example, a disc brake system (not shown) that is operated with a hydraulic pressure regulated by an actuator.

Wheel speed sensors 127A and 127B are connected to brake system 121. Wheel speed sensor 127A detects a rotation speed of a front wheel and outputs a detection value thereof to brake system 121. Wheel speed sensor 127B detects a rotation speed of a rear wheel and outputs a detection value thereof to brake system 121.

Brake system 121 generates a braking command to a braking apparatus in accordance with a prescribed control request outputted from ADK 200 through VCIB 111 and integrated control manager 115. Brake system 121 then controls the braking apparatus based on the generated braking command. Integrated control manager 115 can calculate a speed of the vehicle (vehicle speed) based on the rotation speed of each wheel.

Steering system 122 is configured to control a steering angle of a steering wheel of the vehicle with a steering apparatus. The steering apparatus includes, for example, rack-and-pinion electric power steering (EPS) that allows adjustment of a steering angle by an actuator.

Pinion angle sensor 128 is connected to steering system 122. Pinion angle sensor 128 detects an angle of rotation (a pinion angle) of a pinion gear coupled to a rotation shaft of the actuator included in the steering apparatus and outputs a detection value thereof to steering system 122.

Steering system 122 generates a steering command to the steering apparatus in accordance with a prescribed control request outputted from ADK 200 through VCIB 111 and integrated control manager 115. Then, steering system 122 controls the steering apparatus based on the generated steering command.

Powertrain system 123 controls an electric parking brake (EPB) system provided in at least one of a plurality of wheels, a parking lock (P-Lock) system provided in a transmission of base vehicle 100, and a propulsion system including a shift apparatus for selecting a shift range. A detailed configuration of powertrain system 123 will be described later with reference to FIG. 2.

Active safety system 125 detects an obstacle (a pedestrian, a bicycle, a parked vehicle, a utility pole, or the like) in front or in the rear of the vehicle with the use of camera 129A and radar sensors 129B and 129C. Active safety system 125 determines whether or not vehicle 10 may collide with the obstacle based on a distance between vehicle 10 and the obstacle and a direction of movement of vehicle 10. Then, when active safety system 125 determines that there is possibility of collision, it outputs a braking command to brake system 121 through integrated control manager 115 so as to increase braking force of the vehicle.

Body system 126 is configured to control, for example, components such as a direction indicator, a horn, and a wiper (none of which is shown), depending on a state or an environment of travel of vehicle 10. Body system 126 controls each component in accordance with a prescribed control request outputted from ADK 200 through VCIB 111 and integrated control manager 115.

VCIB 111 is configured to communicate with ADS 202 of ADK 200 over a controller area network (CAN). VCIB 111 receives various control requests from ADS 202 or outputs a status of VP 120 to ADS 202 by executing a prescribed API defined for each communicated signal. When VCIB 111 receives the control request from ADS 202, it outputs a control command corresponding to the control request to a system corresponding to the control command through integrated control manager 115. VCIB 111 obtains various types of information on base vehicle 100 from each system through integrated control manager 115 and outputs the status of base vehicle 100 as the vehicle status to ADS 202.

Vehicle 10 may be adopted as one of features of a mobility as a service (MaaS) system. The MaaS system further includes, for example, a data server and a mobility service platform (MSPF) (neither of which is shown), in addition to vehicle 10.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF. Various mobility services including mobility services can use various functions provided by the MSPF by using APIs published on the MSPF, depending on service contents.

VP 120 further includes a data communication module (DCM) (not shown) as a communication interface (I/F) to wirelessly communicate with a data server of the MaaS system. The DCM outputs various types of vehicle information such as a speed, a position, or an autonomous driving state to the data server. The DCM receives from the autonomous driving related mobility services through the MSPF and the data server, various types of data for management of travel of an autonomous driving vehicle including vehicle 10 in the mobility services.

The MSPF publishes APIs for using various types of data on vehicle statuses and vehicle control necessary for development of the ADK. Various mobility services can use various functions provided by the MSPF depending on service contents, by using the APIs published on the MSPF. For example, the autonomous driving related mobility services can obtain operation control data of an autonomous driving vehicle that communicates with the data server or information stored in the data server from the MSPF by using the APIs published on the MSPF. The autonomous driving related mobility services can transmit data for managing an autonomous driving vehicle including vehicle 10 to the MSPF by using the API.

Figure 2:
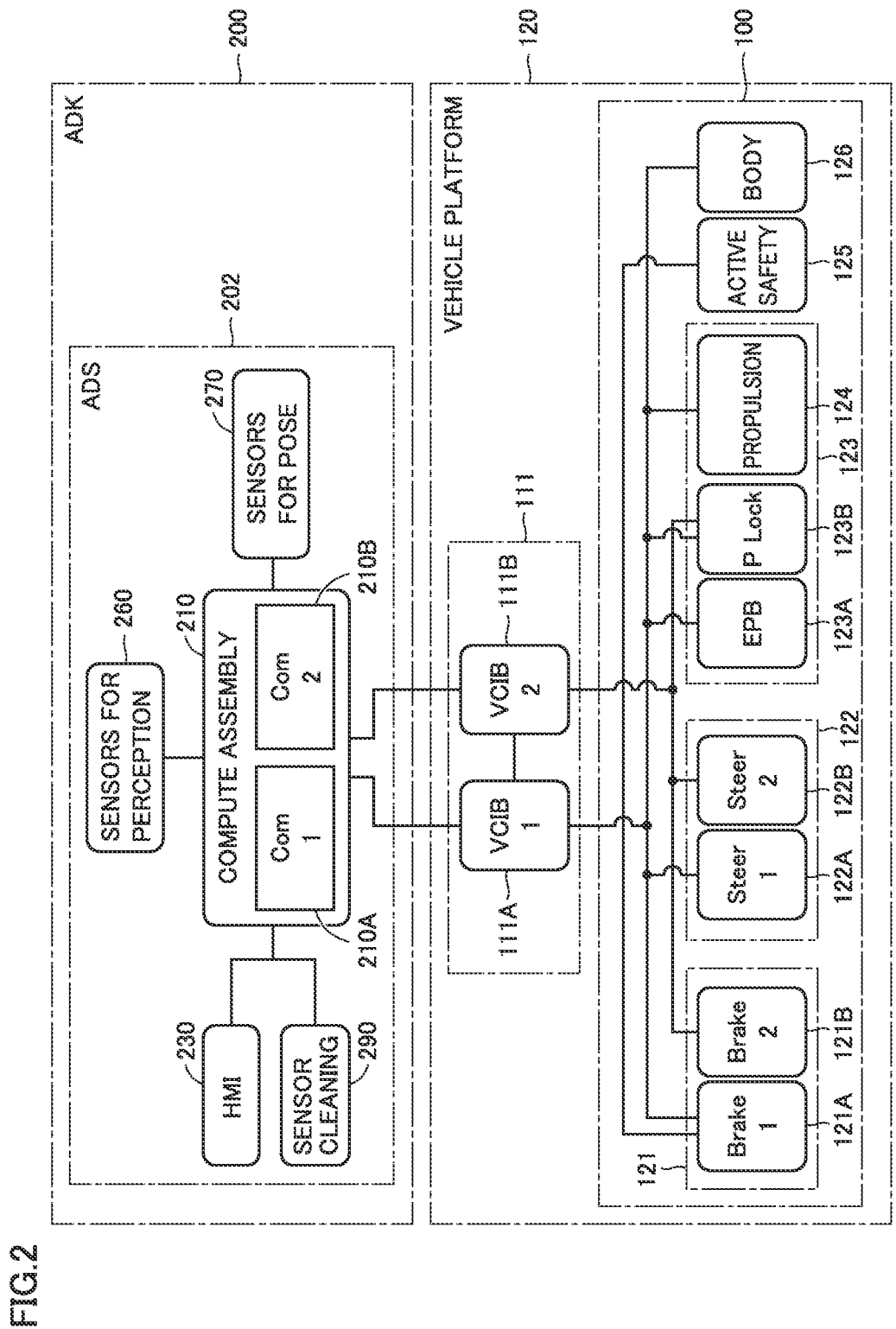
FIG. 2 is a diagram showing in further detail, a configuration of an ADK (ADS) and a VP shown in FIG. 1.

FIG. 2 is a diagram showing in further detail, a configuration of ADK 200 (ADS 202) and VP 120 shown in FIG. 1. Referring to FIG. 2, ADS 202 of ADK 200 includes a compute assembly 210, a human machine interface (HMI) 230, sensors for perception 260, sensors for pose 270, and a sensor cleaning 290.

Compute assembly 210 includes communication modules 210A and 210B. Communication modules 210A and 210B are configured to communicate with VCIB 111. During autonomous driving of vehicle 10, compute assembly 210 obtains an environment around the vehicle and a pose, a behavior, and a position of vehicle 10 from various sensors (which will be described later), and obtains a vehicle status from VP 120 through VCIB 111 and sets a next operation (acceleration, deceleration, or turning) of vehicle 10. Then, compute assembly 210 outputs various commands for realizing a set next operation to VCIB 111 in VP 120.

HMI 230 presents information to a user and accepts an operation by the user during autonomous driving, during driving requiring an operation by a user, or at the time of transition between autonomous driving and driving requiring an operation by the user. HMI 230 is constructed to be connected to an input and output apparatus (not shown) such as a touch panel display provided in VP 120.

Sensors for perception 260 are sensors that perceive an environment around the vehicle. Sensors for perception 260 include, for example, at least one of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is output to compute assembly 210.

Sensors for pose 270 are sensors that detect a pose, a behavior, or a position of vehicle 10. Sensors for pose 270 include, for example, an inertial measurement unit (IMU) and a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 290 removes soiling attached to various sensors. Sensor cleaning 290 removes soiling attached to a lens of the camera or a portion from which laser beams or radio waves are emitted, for example, with a cleaning solution or a wiper.

VCIB 111 includes a VCIB 111A and a VCIB 111B. Each of VCIBs 111A and 111B includes an electronic control unit (ECU). The ECU includes a processor such as a not-shown central processing unit (CPU) and a memory (a read only memory (ROM) and a random access memory (RAM)). A program executable by the processor is stored in the ROM. The processor performs various types of processing in accordance with the program stored in the ROM.

VCIBs 111A and 111B are communicatively connected to communication modules 210A and 210B of ADS 202, respectively. VCIB 111A and VCIB 111B are also communicatively connected to each other. Though VCIB 111B is equivalent in function to VCIB 111A, it is partially different in a plurality of systems connected thereto that make up VP 120.

VCIBs 111A and 111B each relay control requests and vehicle statuses between ADS 202 and VP 120. More specific description will be given representatively for VCIB 111A. VCIB 111A receives various control requests outputted from ADS 202 in accordance with an API defined for each control request. Then, VCIB 111A generates a command corresponding to the received control request and outputs the command to a system of base vehicle 100 corresponding to the control request. In the present embodiment, the control request (control command) received from ADS 202 includes a power mode command that requests control of a power mode (which will be described later) of VP 120.

VCIB 111A receives vehicle information provided from each system of VP 120 and transmits information indicating the vehicle status of VP 120 to ADS 202 in accordance with an API defined for each vehicle status. The information indicating the vehicle status to be transmitted to ADS 202 may be information identical to the vehicle information provided from each system of VP 120 or may be information extracted from the vehicle information to be used for processing performed by ADS 202. In the present embodiment, the vehicle status transmitted to ADS 202 includes a power mode status indicating a status of the power mode of VP 120.

As VCIBs 111A and 111B equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnecting a control system where failure has occurred.

Brake system 121 includes brake systems 121A and 121B. Steering system 122 includes steering systems 122A and 122B. Powertrain system 123 includes an EPB system 123A, a P-Lock system 123B, and a propulsion system 124.

VCIB 111A is communicatively connected to brake system 121A, steering system 122A, EPB system 123A, P-Lock system 123B, propulsion system 124, and body system 126 through a communication bus. VCIB 111B is communicatively connected to brake system 121B, steering system 122B, and P-Lock system 123 through a communication bus.

Brake systems 121A and 121B are configured to control a plurality of braking apparatuses provided in wheels. Brake system 121B may be equivalent in function to brake system 121A, or one of brake systems 121A and 121B may be configured to independently control braking force of each wheel during travel of the vehicle and the other thereof may be configured to control braking force such that equal braking force is generated in the wheels during travel of the vehicle.

Brake systems 121A and 121B each generate a braking command to the braking apparatus in accordance with a control request received from ADS 202 through VCIB 111. For example, brake systems 121A and 121B control the braking apparatus based on a braking command generated in one of the brake systems, and when a failure occurs in that brake system, the braking apparatus is controlled based on a braking command generated in the other brake system.

Steering systems 122A and 122B are configured to control a steering angle of a steering wheel of vehicle 10 with a steering apparatus. Steering system 122B is similar in function to steering system 122A.

Steering systems 122A and 122B each generate a steering command to the steering apparatus in accordance with a control request received from ADS 202 through VCIB 111. For example, steering systems 122A and 122B control the steering apparatus based on the steering command generated in one of the steering systems, and when a failure occurs in that steering system, the steering apparatus is controlled based on a steering command generated in the other steering system.

EPB system 123A is configured to control the EPB. The EPB is provided separately from the braking apparatus, and fixes a wheel by an operation of an actuator. The EPB, for example, activates a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a control request received from ADS 202 through VCIB 111.

P-Lock system 123B is configured to control a P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of base vehicle 100. Rotation of an output shaft of the transmission is thus fixed and the wheel is fixed.

P-Lock system 123B controls the P-Lock apparatus in accordance with a control request received from ADS 202 through VCIB 111. When the control request from ADS 202 includes a request to set the shift range to a parking range (P range), P-Lock system 123B activates the P-Lock apparatus, and when the control request includes a request to set the shift range to a shift range other than the P range, it deactivates the P-Lock apparatus.

Propulsion system 124 is configured to switch a shift range with the use of a shift apparatus and to control driving force of vehicle 10 in a direction of movement of vehicle 10 that is generated from a drive source. Switchable shift ranges include, for example, the P range, a neutral range (N range), a forward travel range (D range), and a rearward travel range (R range). The drive source includes, for example, a motor generator and an engine.

Propulsion system 124 controls the shift apparatus and the drive source in accordance with a control request received from ADS 202 through VCIB 111.

Active safety system 125 is communicatively connected to brake system 121A. As described above, active safety system 125 detects an obstacle (an obstacle or a human) in front of the vehicle by using camera 129A and radar sensor 129B, and when it determines that there is possibility of collision based on a distance to the obstacle, it outputs a braking command to brake system 121A so as to increase braking force.

Body system 126 can control components such as a direction indicator, a horn, or a wiper in accordance with a control request received from ADS 202 through VCIB 111.

For example, when an autonomous mode is selected as the autonomous state by an operation by the user onto HMI 230 in vehicle 10 configured above, autonomous driving is carried out. During autonomous driving, ADS 202 initially creates a driving plan as described above. Examples of the driving plan include a plan to continue straight travel, a plan to turn left/right at a prescribed intersection on a predetermined travel path, and a plan to change a travel lane.

ADS 202 calculates a controllable physical quantity (an acceleration, a deceleration, and a wheel steer angle) necessary for operations of vehicle 10 in accordance with the created driving plan. ADS 202 splits the physical quantity for each execution cycle time of the API. ADS 202 outputs a control request representing the split physical quantity to VCIB 111 by means of the API. Furthermore, ADS 202 obtains a vehicle status (an actual direction of movement of the vehicle and a state of fixation of the vehicle) from VP 120 and creates again the driving plan on which the obtained vehicle status is reflected. ADS 202 thus allows autonomous driving of vehicle 10.

Figure 3:
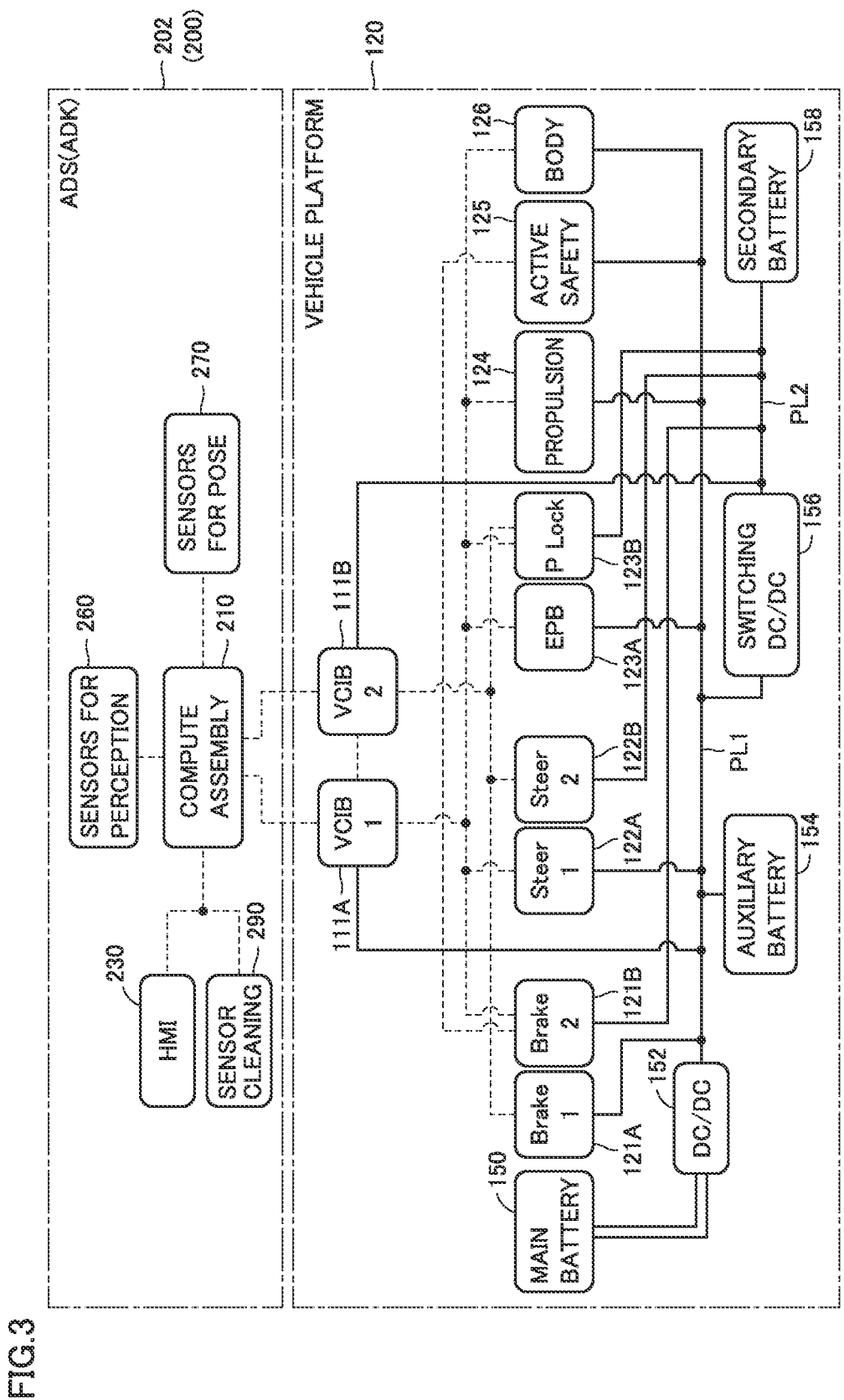
FIG. 3 is a diagram illustrating a configuration of a power supply of the VP.

FIG. 3 is a diagram illustrating a configuration of a power supply of VP 120. FIG. 3 is based on FIG. 2. Referring to FIG. 3, VP 120 further includes a main battery 150, a DC/DC converter 152, an auxiliary battery 154, a switching DC/DC converter 156, and a secondary battery 158, in addition to each system and each sensor described with reference to FIG. 2.

Main battery 150 includes a plurality of (for example, several hundred) cells. Each cell is, for example, a secondary battery such as a lithium ion battery or a nickel metal hydride battery. Main battery 150 outputs electric power for generating driving force of VP 120 (base vehicle 100) to a vehicle drive system (not shown). A voltage of main battery 150 is, for example, several hundred volts. Instead of main battery 150, a power storage element such as an electric double layer capacitor may be employed.

DC/DC converter 152 is electrically connected between main battery 150 and a power line PL1. DC/DC converter 152 down-converts electric power supplied from main battery 150 to an auxiliary machinery voltage (for example, more than ten volts or several ten volts) lower than the voltage of main battery 150 and outputs down-converted electric power to power line PL1, in accordance with a command from a not-shown ECU. DC/DC converter 152 is implemented, for example, by an isolated DC/DC converter including a transformer.

Auxiliary battery 154 is electrically connected to power line PL1. Auxiliary battery 154 is a chargeable and dischargeable secondary battery, and implemented, for example, by a lead acid battery. Auxiliary battery 154 can store electric power outputted from DC/DC converter 152 to power line PL1. Auxiliary battery 154 can feed stored electric power to each system electrically connected to power line PL1.

Switching DC/DC converter 156 is electrically connected between power line PL1 and a power line PL2. Switching DC/DC converter 156 supplies electric power from power line PL1 to power line PL2 in accordance with a command from the not-shown ECU. When switching DC/DC converter 156 receives a shutdown command from the ECU, it electrically disconnects power line PL2 (secondary battery 158) from power line PL1 by shutting down. Switching DC/DC converter 156 is implemented, for example, by a chopper DC/DC converter that can switch between conduction and disconnection by a semiconductor switching element.

Secondary battery 158 is electrically connected to power line PL2. Secondary battery 158 is a chargeable and dischargeable secondary battery, and implemented, for example, by a lithium ion secondary battery. Secondary battery 158 can store electric power outputted from switching DC/DC converter 156 to power line PL2. Secondary battery 158 can supply stored electric power to each system electrically connected to power line PL2.

DC/DC converter 152 and auxiliary battery 154 implement a primary power supply system of VP 120. Brake system 121A, steering system 122A, EPB system 123A, propulsion system 124, active safety system 125, body system 126, and VCIB 111A are electrically connected to power line PL1 which is a power supply line of the primary power supply system, and these systems receive supply of electric power from the primary power supply system.

Switching DC/DC converter 156 and secondary battery 158 implement a secondary power supply system of VP 120. Brake system 121B, steering system 122B, P-Lock system 123B, and VCIB 111B are electrically connected to power line PL2 which is a power supply line of the secondary power supply system, and these systems receive supply of electric power from the secondary power supply system.

The secondary power supply system constituted of switching DC/DC converter 156 and secondary battery 158 functions as a redundant power supply for the primary power supply system constituted of DC/DC converter 152 and auxiliary battery 154. When a power feed function of the primary power supply system fails and power cannot be fed to each system connected to power line PL1, the secondary power supply system continues power feed to each system connected to power line PL2 at least for a certain period of time such that the function of VP 120 is not immediately completely lost.

<Description of Power Mode>

Vehicle 10 according to the present embodiment includes four power modes of a sleep mode (Sleep), a wake mode (Wake), an ignition on mode (Ignition ON), and a drive mode (Drive) as power modes that indicate a power supply state of VP 120.

Figures 4, 5:
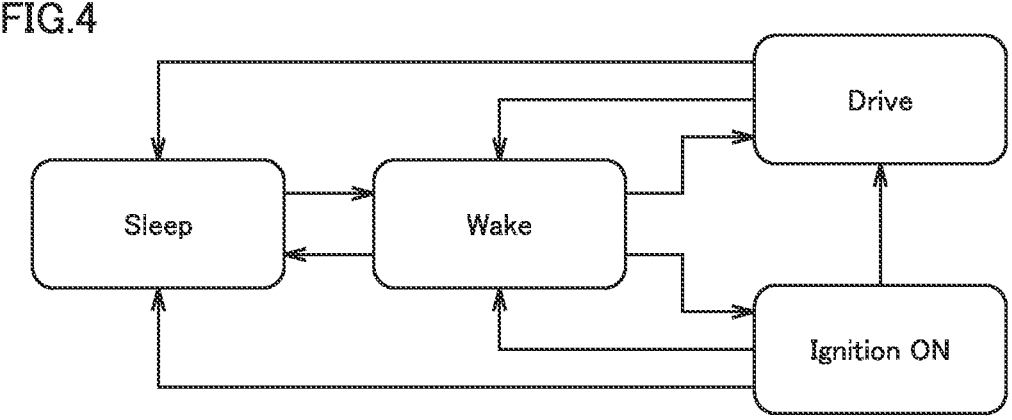
FIG. 4 is a diagram illustrating a power mode of the VP.
FIG. 5 is a diagram showing a power mode command received by a VCIB from the ADS.

FIG. 4 is a diagram illustrating a power mode of VP 120. Referring to FIG. 3 together with FIG. 4, the sleep mode (Sleep) refers to a state in which the power supply of VP 120 is off. In the sleep mode, power is not fed from main battery 150 to each system, and VCIB 111 (VCIBs 111A and 111B) and each system (ECU) of base vehicle 100 have not been turned on.

The wake mode (Wake) refers to a state that VCIB 111 is awake by power feed from auxiliary battery 154. In the wake mode, power is not fed from main battery 150, and ECUs other than VCIB 111 are not awake except for some body electrical ECUs (for example, a verification ECU for verifying a smart key or a body ECU that controls locking/unlocking of a door) in body system 126.

In the wake mode, VCIB 111 performs processing such as establishment of communication with ADK 200, device authentication to authenticate whether or not ADK 200 is a registered device, turn-on of the above-described some body electrical ECUs, or execution of the APIs associated with these ECUs.

In the sleep mode, when VCIB 111 receives a power mode command that indicates transition to the wake mode from ADS 202 in accordance with a prescribed API, the power mode makes transition from the sleep mode to the wake mode.

The ignition on mode (Ignition ON) corresponds to what is called an "ignition on" state of the vehicle. In the ignition on mode, a larger number of systems (ECUs) are turned on than in the wake mode, and basically, a low-voltage system (including also VCIB 111) fed with power by auxiliary battery 154 is turned on. On the other hand, in this ignition on mode, power is not fed from main battery 150 and VP 120 is unable to travel.

In the wake mode, when VCIB 111 receives a power mode command that indicates transition to the ignition on mode from ADS 202 in accordance with a prescribed API, the power mode makes transition from the wake mode to the ignition on mode.

The drive mode (Drive) refers to a state in which the power supply of the vehicle is on. In the drive mode, power is fed from main battery 150 so that VCIB 111 and each system of base vehicle 100 are turned on and VP 120 is able to travel.

In the wake mode or the ignition on mode, when VCIB 111 receives a power mode command that indicates transition to the drive mode from ADS 202 in accordance with a prescribed API, the power mode makes transition to the drive mode.

In the drive mode, when VCIB 111 receives a power mode command that indicates transition to the sleep mode or the wake mode from ADS 202 in accordance with a prescribed API, the power mode makes transition from the drive mode to the sleep mode or the wake mode.

In the drive mode, even when VCIB 111 receives a power mode command that indicates transition to the ignition on mode from ADS 202, the power mode does not make transition to the ignition on mode. For example, when the power mode of VP 120 has been set to the drive mode at the time of reception by VCIB 111 of the power mode command indicating transition to the ignition on mode from ADS 202, VCIB 111 may ignore the request for transition to the ignition on mode in the power mode command.

Thus, once the power mode is set to a mode other than the drive mode, the power mode makes transition to the drive mode via the wake mode. Therefore, the power mode is not set to the drive mode while VCIB 111 that interfaces between VP 120 and ADS 202 is not awake. Therefore, VP 120 can be prevented from being in a travelable state without VP 120 and ADS 202 being interfaced with each other.

In the ignition on mode, when VCIB 111 receives a power mode command that indicates transition to the sleep mode or the wake mode from ADS 202 in accordance with a prescribed API, the power mode makes transition from the ignition on mode to the sleep mode or the wake mode. In the wake mode, when VCIB 111 receives a power mode command that indicates transition to the sleep mode from ADS 202, the power mode makes transition to the sleep mode.

FIG. 5 is a diagram showing a power mode command received by VCIB 111 from ADS 202. Referring to FIG. 5, in vehicle 10, as ADS 202 transmits a power mode command to VCIB 111 in accordance with a prescribed API, the power mode of VP 120 can be controlled from ADS 202.

The power mode command can take any of values 0 to 6 as an argument. The value 0 is set when no request for the power mode of VP 120 is issued from ADS 202. When VCIB 111 receives the power mode command in which the value 0 has been set, VP 120 maintains the power mode at that time.

A value 1 is set when a request for the sleep mode (Sleep) is issued from ADS 202. In other words, the power mode command in which the value 1 has been set requests turn-off of VP 120. When VCIB 111 receives the power mode command in which the value 1 has been set, the power mode of VP 120 makes transition to the sleep mode and VP 120 is set to a power off state.

A value 2 is set when a request for the wake mode (Wake) is issued from ADS 202. In other words, the power mode command in which the value 2 has been set requests turn-on of VCIB 111. When VCIB 111 receives the power mode command in which the value 2 has been set, the power mode of VP 120 makes transition to the wake mode and VCIB 111 is turned on by receiving power feed from the auxiliary battery.

A value 5 is set when a request for the ignition on mode (Ignition ON) is issued from ADS 202. In other words, the power mode command in which the value 5 has been set requests that VP 120 (base vehicle 100) be in the "ignition on" state. When VCIB 111 receives the power mode command in which the value 5 has been set, the power mode of VP 120 makes transition to the ignition on mode and the low-voltage system (including also VCIB 111) fed with power from auxiliary battery 154 is turned on.

The value 6 is set when a request for the drive mode (Drive) is issued from ADS 202. In other words, the power mode command in which the value 6 has been set requests turn-on of VP 120. When VCIB 111 receives the power mode command in which the value 6 has been set, the power mode of VP 120 makes transition to the drive mode and VP 120 is set to a power on state. Values 3 and 4 are not used at the current time point and reserved for future expansion.

FIG. 6 is a diagram showing a power mode status signal outputted from VCIB 111 to ADS 202. Referring to FIG. 6, in vehicle 10, ADS 202 is notified of a status of the power mode of VP 120 by transmission of a signal indicating a status of the power mode from VCIB 111 to ADS 202 in accordance with a prescribed API.

A power mode status signal transmitted to ADS 202 can take any of values 0 to 7 as an argument. The values 1, 2, 5, and 6 are set when the power mode is set to the sleep mode (Sleep), the wake mode (Wake), the ignition on mode (Ignition ON), and the drive mode (Drive), respectively. The value 7 is set when some unhealthy situation occurs in the power supply of VP 120. The values 0, 3, and 4 are not used at the current time point and reserved.

When switching to the sleep mode is requested (in a power mode command from ADS 202, VCIB 111 outputs a power mode status signal to ADS 202 with the value 1 (sleep mode) being set therein for a prescribed time period (3000 ms) after sleep processing to turn off the power supply of VP 120, and thereafter shuts down. Since VCIB 111 also shuts down during the sleep mode, VCIB 111 is unable to notify ADS 202 of the power mode status. According to the configuration above, however, VCIB 111 can notify ADS 202 of transition of the power mode to the sleep mode. While VCIB 111 outputs the power mode status signal in which the value 1 (sleep mode) has been set to ADS 202 for the prescribed time period, ADS 202 stops transmission of various commands to VCIB 111.

Figure 7:
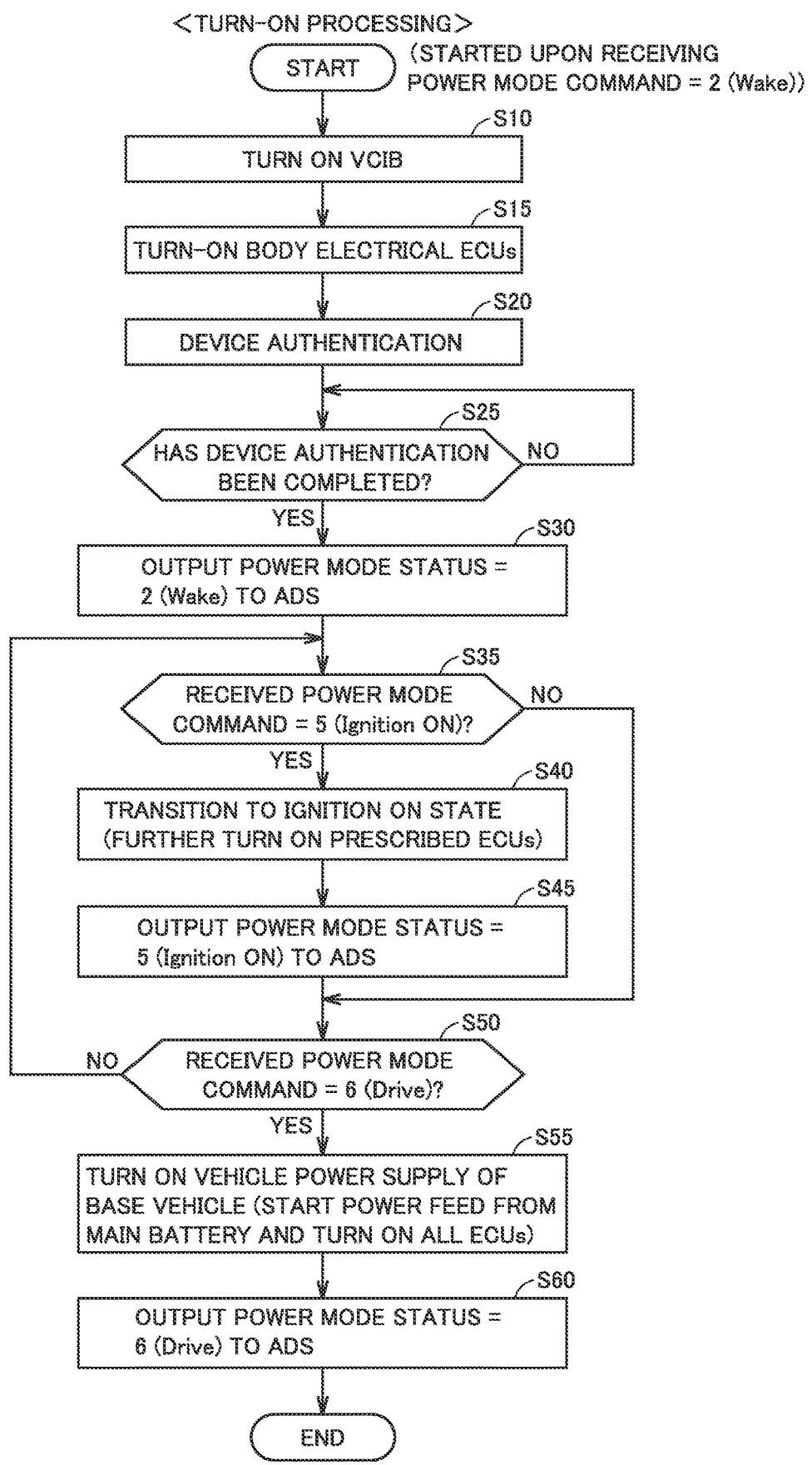
FIG. 7 is a flowchart showing an exemplary procedure of processing by the VCIB at the time when the VP is turned on in accordance with a power mode command from the ADS.

FIG. 7 is a flowchart showing an exemplary procedure of processing by VCIB 111 at the time when VP 120 is turned on in accordance with a power mode command from ADS 202. This flowchart is started when VCIB 111 receives a power mode command in which the value 2 (wake mode) has been set from ADS 202.

Referring to FIG. 7, VCIB 111 is turned on when it receives the power mode command in which the value 2 (wake mode) has been set from ADS 202 (step S10). Then, VCIB 111 outputs a turn-on command to some body electrical ECUs (the verification ECU or the body ECU) and turns on APIs associated with these ECUs (step S15).

Then, VCIB 111 establishes communication with ADS 202, and after communication is established, it performs device authentication processing for ADS 202 (step S20). As device authentication processing of ADS 202 is completed (YES in step S25), VCIB 111 outputs the power mode status signal in which the value 2 (wake mode) has been set to ADS 202 (step S30).

Then, VCIB 111 determines whether or not it has received the power mode command in which the value 5 (ignition on mode) had been set from ADS 202 (step S35). When VCIB 111 has not received the power mode command in which the value 5 had been set from ADS 202 (NO in step S35), the process makes transition to step S50 which will be described later.

When VCIB 111 has received the power mode command in which the value 5 had been set in step S35 (YES in step S35), VCIB 111 instructs base vehicle 100 to make transition to the ignition on state (step S40). A larger number of systems (ECUs) than in the wake mode are thus turned on, and basically, the low-voltage system fed with power from auxiliary battery 154 is turned on. Then, VCIB 111 outputs the power mode status signal in which the value 5 (ignition on mode) has been set to ADS 202 (step S45).

Then, VCIB 111 determines whether or not it has received the power mode command in which the value 6 (Drive mode) had been set from ADS 202 (step S50). When VCIB 111 has not received the power mode command in which the value 6 had been set from ADS 202 (NO in step S50), the process returns to step S35.

In step S50, when VCIB 111 receives the power mode command in which the value 6 has been set (YES in step S50), VCIB 111 instructs base vehicle 100 to turn on the vehicle power supply (step S55). In base vehicle 100, DC/DC converter 152 (FIG. 3) is thus turned on and power feed from main battery 150 is started, and each system is turned on. Then, VCIB 111 sets the value 6 (Drive mode) in the power mode status signal and outputs the power mode status signal to ADS 202 (step S60).

Figure 8:
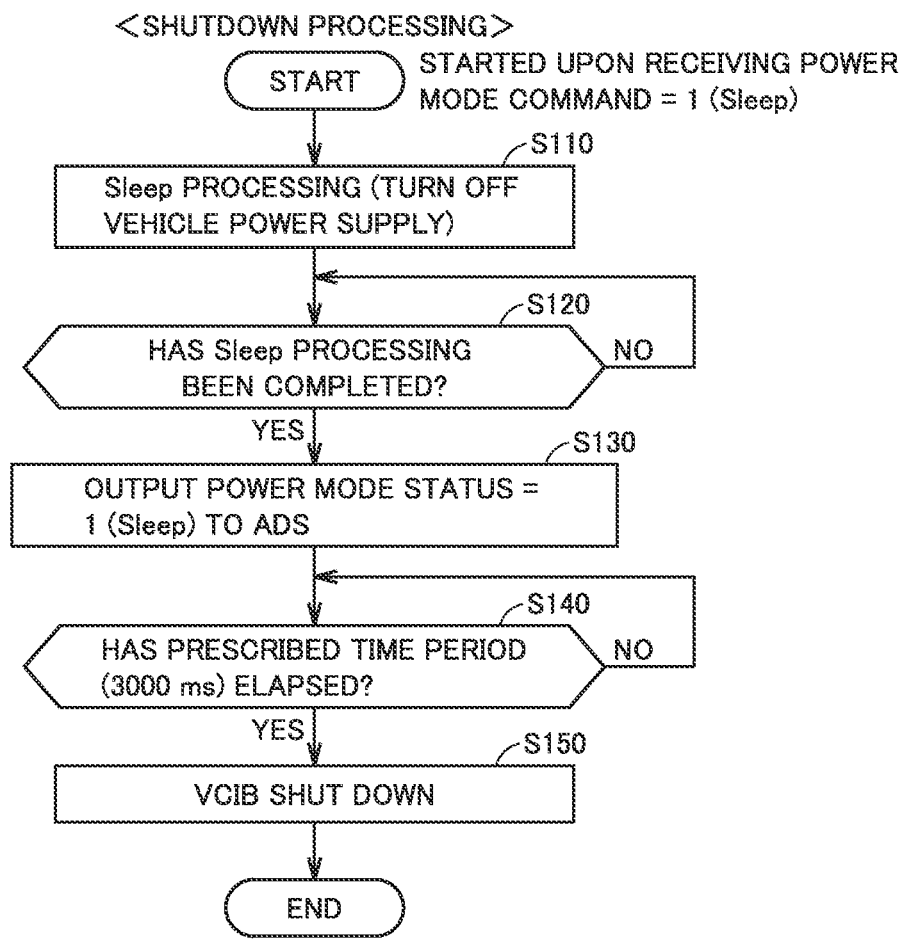
FIG. 8 is a flowchart showing an exemplary procedure of processing by the VCIB at the time when the VP is shut down in accordance with a power mode command from the ADS.

FIG. 8 is a flowchart showing an exemplary procedure of processing by VCIB 111 at the time when VP 120 is shut down in accordance with a power mode command from ADS 202. This flowchart is started when VCIB 111 receives a power mode command in which the value 1 (sleep mode) has been set from ADS 202.

Referring to FIG. 8, when VCIB 111 receives the power mode command in which the value 1 (sleep mode) has been set from ADS 202, it performs sleep processing (step S110). Specifically, VCIB 111 instructs base vehicle 100 to turn off the vehicle power supply.

When the power supply of base vehicle 100 is turned off and sleep processing is completed (YES in step S120), VCIB 111 sets the value 1 (sleep mode) in the power mode status signal and outputs the power mode status signal to ADS 202 (step S130).

Then, VCIB 111 determines whether or not a prescribed time period (3000 ms) has elapsed since output to ADS 202, of the power mode status signal in which the value 1 had been set (step S140). During this period, VCIB 111 prepares for shutdown of the VCIB itself.

When the prescribed time period has elapsed (YES in step S140), VCIB 111 stops communication with ADS 202 and shuts down (step S150).

As set forth above, in this embodiment, there are four power modes of the sleep mode (Sleep), the wake mode (Wake), the ignition on mode (Ignition ON), and the drive mode (Drive) and VCIB 111 receives a power mode command that requests control of the power mode from ADS 202. Therefore, according to this embodiment, ADS 202 can control the four power modes of VP 120 through VCIB 111.

In addition, in this embodiment, VCIB 111 transmits the power mode status signal indicating the status of the power mode of VP 120 to ADS 202. ADS 202 can thus recognize the status of the power mode of VP 120 and can carry out appropriate control in accordance with each mode.

Furthermore, in this embodiment, after VCIB 111 performs sleep processing in accordance with the request for the sleep mode, VCIB 111 transmits the power mode status signal in which the value 1 (sleep mode) has been set to ADS 202 for the prescribed time period (3000 ms) and thereafter shuts down. VCIB 111 can thus notify ADS 202 of transition of the power mode to the sleep mode.

EXAMPLE

API Specification for TOYOTA Vehicle Platform
Ver. 1.1
Records of Revision

| Date of Revision | ver. | Overview of Revision | Reviser |
|---|---|---|---|
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

TABLE OF CONTENTS

1. Introduction
    1.1. Purpose of this Specification
    1.2. Target Vehicle
    1.3. Definition of Term
2. Structure
    2.1. Overall Structure of Autono-MaaS Vehicle
    2.2. System Structure of Autono-MaaS Vehicle
3. Application Interfaces
    3.1. Typical Usage of APIs
    3.2. APIs for Vehicle Motion Control
        3.2.1. API List for Vehicle Motion Control
        3.2.2. Details of Each API for Vehicle Motion Control
    3.3. APIs for BODY Control
        3.3.1. API List for BODY Control
        3.3.2. Details of Each API for BODY Control
    3.4. APIs for Power Control
        3.4.1. API List for Power Control
        3.4.2. Details of Each API for Power Control
    3.5. APIs for Failure Notification
        3.5.1. API List for Failure Notification
        3.5.2. Details of Each API for Failure Notification
    3.6. APIs for Security
        3.6.1. API List for Security
        3.6.2. Details of Each API for Security
4. API Guides to Control Toyota Vehicles
    4.1. APIs for Vehicle Motion Control
        4.1.1. API List for Vehicle Motion Control
        4.1.2. API Guides in Details for Vehicle Motion Control
    4.2. APIs for BODY Control
        4.2.1. API List for BODY Control
    4.3. APIs for Power Control
        4.3.1. API List for Power Control
    4.4. APIs for Failure Notification
        4.4.1. API List for Failure Notification
    4.5. APIs for Security
        4.5.1. API List for Security
        4.5.2. API Guides in Details for Security 1. Introduction 1.1. Purpose of this Specification This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. Structure 2.1. Overall Structure of Autono-MaaS Vehicle

Figure 9:
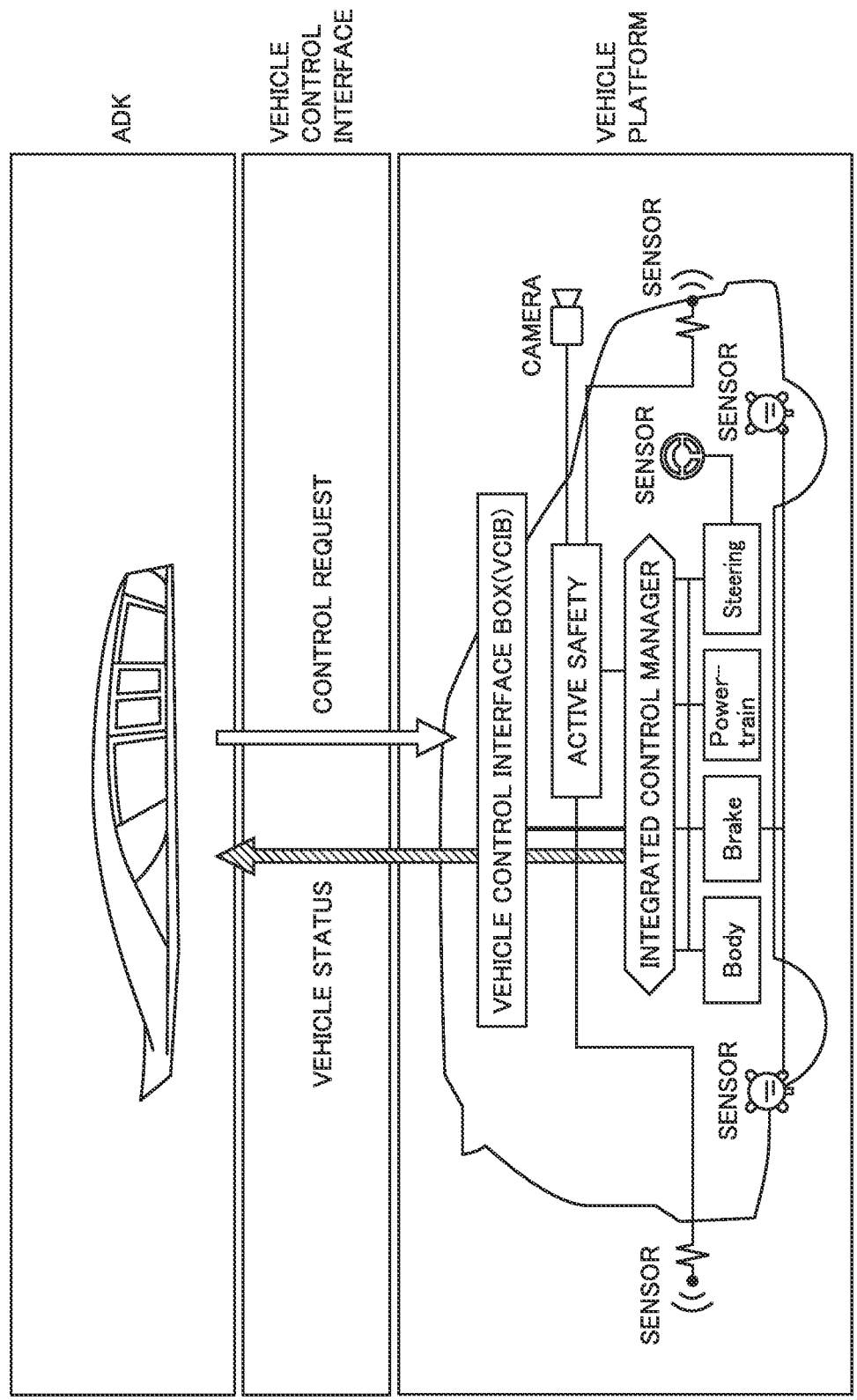
FIG. 9 is a diagram showing an overall structure of an Autono-MaaS vehicle.

The overall structure of Autono-MaaS is shown (FIG. 9).

2.2. System Structure of Autono-MaaS Vehicle

Figure 10:
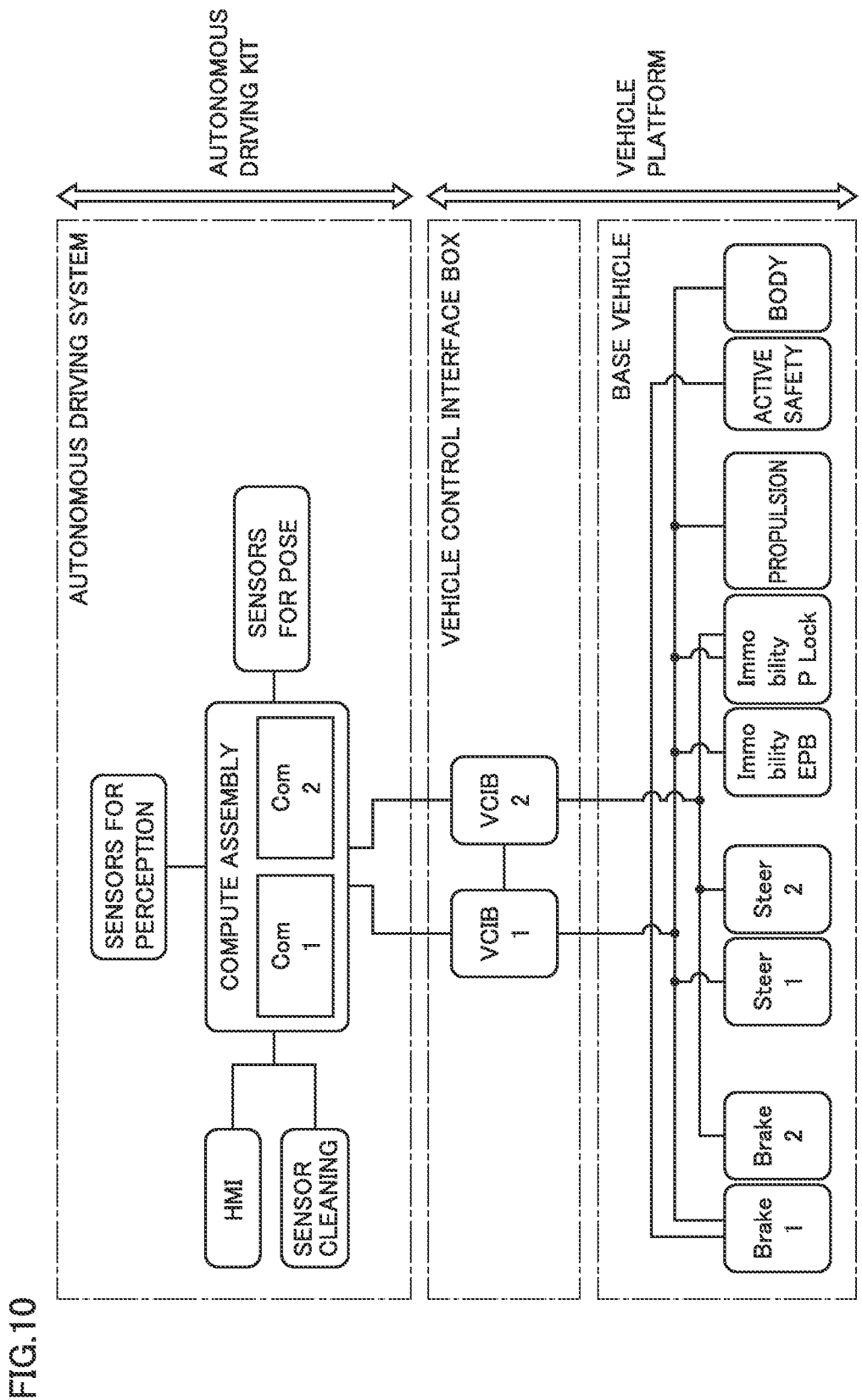
FIG. 10 is a diagram showing a system architecture of the Autono-MaaS vehicle.

System Architecture is shown in FIG. 10.

3. Application Interfaces 3.1. Typical Usage of APIs

In this section, Typical Usage of APIs is described.

A typical workflow of APIs is as follows (FIG. 11). The following example assumes CAN for physical communication.

3.2. APIs for Vehicle Motion Control

In this section, the APIs for vehicle motion control are described.

3.2.1. API List for Vehicle Motion Control
3.2.1.1. Inputs

TABLE 3

Input APIs for vehicle motion control

| Signal Name | Description | Redundancy |
|---|---|---|
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK

3.2.1.2. Outputs

TABLE 4

Output APIs for vehicle motion control

| Signal Name | Description | Redundancy |
|---|---|---|
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control
3.2.2.1. Propulsion Direction Command Request for shift change from/to forward (D range) to/from back (R range)

Values

| Value | Description | Remarks |
|---|---|---|
| 0 | No Request | |
| 2 | R | Shift to R range |
| 4 | D | Shift to D range |
| other | Reserved | |

Remarks

Available only when Vehicle mode state="Autonomous Mode."

Available only when a vehicle is stationary (Traveling direction="standstill").

Available only when brake is applied.

3.2.2.2. Immobilization Command

Request for turning on/off WheelLock

Values

The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks

This API is used for parking a vehicle.

Available only when Vehicle mode state="Autonomous Mode."

Changeable only when the vehicle is stationary (Traveling direction="standstill")

Changeable only while brake is applied.

3.2.2.3. Standstill Command

Request for applying/releasing brake holding function

Values

| Value | Description | Remarks |
|---|---|---|
| 0 | No Request | |
| 1 | Applied | Brake holding function is allowed. |
| 2 | Released | |

Remarks

This API is used for choosing a status of whether the brake holding function is allowed.

Available only when Vehicle mode state="Autonomous Mode."

Acceleration Command (deceleration request) has to be continued until Standstill Status becomes "Applied".

3.2.2.4. Acceleration Command

Request for acceleration

Values

Estimated maximum deceleration to Estimated maximum acceleration [m/s²]

Remarks

Available only when Vehicle mode state="Autonomous Mode."

Acceleration (+) and deceleration (−) request based on Propulsion Direction Status direction.

The upper/lower limit will vary based on Estimated maximum deceleration and Estimated maximum acceleration.

When acceleration more than Estimated maximum acceleration is requested, the request is set to Estimated maximum acceleration.

When deceleration more than Estimated maximum deceleration is requested, the request is set to Estimated maximum deceleration.

In case where a driver operates a vehicle (over-ride), the requested acceleration may not be achieved.

When PCS simultaneously works, VP should choose minimum acceleration (maximum deceleration).

3.2.2.5. Front Wheel Steer Angle Command

Values

| Value | Description | Remarks |
|---|---|---|
| — | | [unit: rad] |

Remarks

Available only when Vehicle mode state="Autonomous Mode"

Left is positive value (+). Right is negative value (−).

Front wheel steer angle is set to value (0) when the vehicle is going straight.

This request is set as a relative value from the current one to prevent misalignment of "Front Wheel Steer Angle" from being accumulated.

The request value should be set within Front wheel steer angle rate limitation.

In case where a driver operates a vehicle (over-ride), the requested Front Wheel Steer Angle may not be achieved.

3.2.2.6. Vehicle Mode Command

Request for changing from/to manual mode to/from Autonomous Mode

Values

| Value | Description | Remarks |
|---|---|---|
| 0 | No Request | |
| 1 | Request For Autonomy | |
| 2 | Deactivation Request | means transition request to manual mode |

Remarks

N/A

3.2.2.7. High Dynamics Command

If ADK would like to increase braking response performance* of VP, High Dynamics Command should be set to "High".

*Reaction time in VP upon a request from ADK

Values

| Value | Description | Remarks |
|---|---|---|
| 0 | No Request | |
| 1 | High | |
| 2-3 | Reserved | |

Remarks

N/A

3.2.2.8. Propulsion Direction Status

Current shift Status

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks if VP does not know the current shift status, this output is set to "Invalid Value."

3.2.2.9. Immobilization Status

Each immobilization system status

Values

The following table shows a case where EPB and Shift P are used for immobilization.

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A 3.2.2.10. Standstill Status

Status of Standstill

| Value | Description | Remarks |
|---|---|---|
| 0 | Released | |
| 1 | Applied | |
| 2 | Reserved | |
| 3 | Invalid value | |

Remarks

N/A 3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.

When the Propulsion Direction Status is "R", deceleration for reverse direction shows a negative value.

3.2.2.14. Front Wheel Steer Angle

Values

| Value | Description | Remarks |
|---|---|---|
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate

Front wheel steer angle rate

Values

| Value | Description | Remarks |
|---|---|---|
| Minimum Value | Invalid value | |
| others | [unit: rad/s] | |

Remarks

Left is positive value (+). Right is negative value (−).

This signal should show invalid value until VP can calculate correct value or when Front wheel steer angle shows the minimum value.

3.2.2.16. Front Wheel Steer Angle Rate Limitation

The limit of the Front wheel steer angle rate

Values

[unit: rad/s]

Remarks

Figure 12:
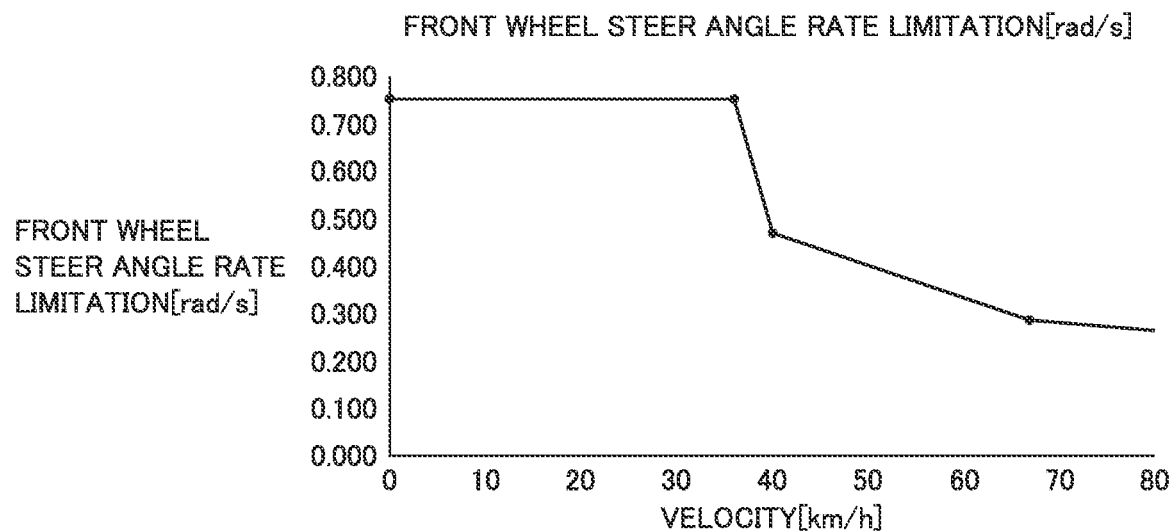
FIG. 12 is a diagram showing relation between a front wheel steer angle rate limitation and a velocity.

The limitation is calculated from the "vehicle speed—steering angle rate" map as shown in following Table 5 and FIG. 12.

A) At a low speed or stopped situation, use fixed value (0.751 [rad/s]).

B) At a higher speed, the steering angle rate is calculated from the vehicle speed using 3.432 m/s$^3$.

TABLE 5

"vehicle speed - steering angle rate" map

| Velocity [km/h] | 0.0 | 36.0 | 40.0 | 67.0 | 84.0 |
|---|---|---|---|---|---|
| Front Wheel Steer Angle Rate Limitation [rad/s] | 0.751 | 0.751 | 0.469 | 0.287 | 0.253 |

3.2.2.17. Estimated Maximum Lateral Acceleration

Values

[unit: m/s$^2$] (fixed value: 3.432)

Remarks

Maximum lateral acceleration defined for VP.

3.2.2.18. Estimated Maximum Lateral Acceleration Rate

Values

[unit: m/s$^3$] (fixed value: 3.432)

Remarks

Maximum lateral acceleration rate defined for VP.

3.2.2.19. Intervention of Accelerator Pedal

This signal shows whether the accelerator pedal is depressed by a driver (intervention).

Values

| Value | Description | Remarks |
|---|---|---|
| 0 | Not depressed | |
| 1 | depressed | |
| 2 | Beyond autonomy acceleration | |

Remarks
　When a position of accelerator pedal is higher than a defined threshold, this signal is set to "depressed".
　When the requested acceleration calculated from a position of accelerator pedal is higher than the requested acceleration from ADS, this signal is set as "Beyond autonomy acceleration."

3.2.2.20. Intervention of Brake Pedal
　This signal shows whether the brake pedal is depressed by a driver (intervention).
Values

| Value | Description | Remarks |
|---|---|---|
| 0 | Not depressed | |
| 1 | depressed | |
| 2 | Beyond autonomy deceleration | |

Remarks
　When a position of brake pedal is higher than the defined threshold value, this signal is set to "depressed".
　When the requested deceleration calculated from a position of brake pedal is higher than the requested deceleration from ADS, this signal is set as "Beyond autonomy deceleration".

3.2.2.21. Intervention of Steering Wheel
　This signal shows whether the steering wheel is operated by a driver (intervention).
Values

| Value | Description | Remarks |
|---|---|---|
| 0 | Not turned | |
| 1 | ADS and driver collaboratively work | |
| 2 | Only by human driver | |

Remarks
　In "Intervention of steering wheel=1", considering the human driver's intent, EPS system drives the steering with the Human driver collaboratively.
　In "intervention of steering wheel=2", considering the human driver's intent, the steering request from ADS is not achieved. (The steering will be driven by human driver.)

3.2.2.22. Intervention of Shift Lever
　This signal shows whether the shift lever is controlled by a driver (intervention)
Values

| Value | Description | Remarks |
|---|---|---|
| 0 | OFF | |
| 1 | ON | Controlled (moved to any shift position) |

Remarks
　N/A 3.2.2.23. Wheel Speed Pulse (Front Left), Wheel Speed Pulse (Front Right), Wheel Speed Pulse (Rear Left), Wheel Speed Pulse (Rear Right)
Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks
　A pulse value is integrated at the pulse falling timing.
　This wheel speed sensor outputs 96 pulses with a single rotation.
　Regardless of invalid/failure of wheel speed sensor, wheel speed pulse will be updated.
　When "1" is subtracted from a pulse value which shows "0", the value changes to "0xFF". When "1" is added to a pulse value which shows "0xFF", the value changes to "0".
　Until the rotation direction is determined just after ECU is activated, a pulse value will be added as the rotation direction is "Forward".
　When detected forward rotation, a pulse value will be added.
　When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)
Values

| Value | Description | Remarks |
|---|---|---|
| 0 | Forward | |
| 1 | Reverse | |
| 2 | Reserved | |
| 3 | Invalid value | The sensor is invalid. |

Remarks
　"Forward" is set until the rotation direction is determined after VP is turned on.

3.2.2.25. Traveling Direction
　Moving direction of vehicle
Values

| Value | Description | Remarks |
|---|---|---|
| 0 | Forward | |
| 1 | Reverse | |
| 2 | Standstill | |
| 3 | Undefined | |

Remarks
　This signal shows "Standstill" when four wheel speed values are "0" during a constant time.
　When shift is changed right after vehicle starts, it is possible to be "Undefined".

3.2.2.26. Vehicle Velocity
Estimated longitudinal velocity of vehicle
Values

| Value | Description | Remarks |
|---|---|---|
| Maximum Value in transmission bits | Invalid value | The sensor is invalid. |
| others | Velocity [unit: m/s] | |

Remarks
The value of this signal is a positive value when both forward direction and reverse direction.

3.2.2.27. Longitudinal Acceleration
Estimated longitudinal acceleration of vehicle
Values

| Value | Description | Remarks |
|---|---|---|
| Minimum Value in transmission bits | Invalid value | The sensor is invalid. |
| others | Acceleration [unit: m/s$^2$] | |

Remarks
Acceleration (+) and deceleration (−) value based on Propulsion Direction Status direction.

3.2.2.28. Lateral Acceleration
lateral acceleration of vehicle
Values

| Value | Description | Remarks |
|---|---|---|
| Minimum Value in transmission bits | Invalid value | The sensor is invalid. |
| others | Acceleration [unit: m/s$^2$] | |

Remarks
A positive value shows counterclockwise. A negative value shows clockwise.

3.2.2.29. Yaw Rate
Sensor value of yaw rate
Values

| Value | Description | Remarks |
|---|---|---|
| Minimum Value in transmission bits | Invalid value | The sensor is invalid. |
| others | Yaw rate [unit: deg/s] | |

Remarks
A positive value shows counterclockwise. A negative value shows clockwise.

3.2.2.30. Slipping Detection
Detection of tire glide/spin/skid

| Value | Description | Remarks |
|---|---|---|
| 0 | Not Slipping | |
| 1 | Slipping | |
| 2 | Reserved | |
| 3 | Invalid value | |

Remarks
This signal is determined as "Slipping" when any of the following systems has been activated.

ABS (Anti-lock Braking System)
TRC (TRaction Control)
VSC (Vehicle Stability Control)
VDIM (Vehicle Dynamics Integrated Management)

3.2.2.31. Vehicle Mode State
Autonomous or manual mode
Values

| Value | Description | Remarks |
|---|---|---|
| 0 | Manual Mode | The mode starts from Manual mode. |
| 1 | Autonomous Mode | |

Remarks
The initial state is set to "Manual Mode."

3.2.2.32. Readiness for Autonomization
This signal shows whether a vehicle can change to Autonomous Mode or not

| Value | Description | Remarks |
|---|---|---|
| 0 | Not Ready For Autonomous Mode | |
| 1 | Ready For Autonomous Mode | |
| 3 | Invalid | The status is not determined yet. |

Remarks
N/A 3.2.2.33. Failure Status of VP Functions for Autonomous Mode
This signal is used to show whether VP functions have some failures mode when a vehicle works as Autonomous Mode.
Values

| Value | Description | Remarks |
|---|---|---|
| 0 | No fault | |
| 1 | Fault | |
| 3 | Invalid | The status is not determined yet. |

Remarks
N/A 3.2.2.34. PCS Alert Status
Values

| Value | Description | Remarks |
|---|---|---|
| 0 | Normal | |
| 1 | Alert | Request alert from PCS system |
| 3 | Unavailable | |

Remarks
N/A 3.2.2.35. PCS Preparation Status
Prefill Status as the preparation of PCS Brake
Values

| Value | Description | Remarks |
|---|---|---|
| 0 | Normal | |
| 1 | Active | |
| 3 | Unavailable | |

Remarks
"Active" is a status in which PCS prepares brake actuator to shorten the latency from a deceleration request issued by PCS.
When a value turns to "Active" during Vehicle mode state="Autonomous Mode," "ADS/PCS arbitration status" shows "ADS".

3.2.2.36. PCS Brake/PCS Brake Hold Status
Values

| Value | Description | Remarks |
|---|---|---|
| 0 | Normal | |
| 1 | PCS Brake | |
| 2 | PCS Brake Hold | |
| 7 | Unavailable | |

Remarks
N/A 3.2.2.37. ADS/PCS Arbitration Status
Arbitration status

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks
When acceleration requested by PCS system in VP is smaller than one requested by ADS, the status is set as "PCS"
When acceleration requested by PCS system in VP is larger than one requested by ADS, the status is set as "ADS"

3.3. APIs for BODY Control
3.3.1. API List for BODY Control
3.3.1.1. Inputs

TABLE 6

Input APIs for BODY Control

| Signal Name | Description | Redundancy |
|---|---|---|
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
|---|---|---|
| Turnsignal status | Status of the current turnsignallight mode of the vehicle platform | N/A |
| Headlight status | Status of the current headlight mode of the vehicle platform | N/A |
| Hazard light status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control
3.3.2.1. Turnsignal Command
Request to control turn-signal
Values

| Value | Description | Remarks |
|---|---|---|
| 0 | OFF | |
| 1 | Right | Right blinker ON |
| 2 | Left | Left blinker ON |
| 3 | Reserved | |

Remarks
N/A

3.3.2.2. Headlight Command
Request to control headlight
Values

| Value | Description | Remarks |
|---|---|---|
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."

Driver operation overrides this command.

3.3.2.3. Hazardlight Command
Request to control hazardlight

| Value | Description | Remarks |
|---|---|---|
| 0 | No Request | |
| 1 | ON | |

Remarks
  Driver operation overrides this command.
  Hazardlight is ON while receiving "ON" command.

3.3.2.4. Horn Pattern Command
Request to choose a pattern of ON-time and OFF-time per cycle
Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks
  N/A

3.3.2.5. Horn Cycle Command
Request to choose the number of ON and OFF cycles
Values
  0 to 7 [-]
Remarks
  N/A

3.3.2.6. Continuous Horn Command
Request to turn on/off horn
Values

| Value | Description | Remarks |
|---|---|---|
| 0 | No request | |
| 1 | ON | |

Remarks
  This command's priority is higher than 3.3.2.4 Horn pattern and 3.3.2.5 Horn cycle command.
  Horn is "ON" while receiving "ON" command.

3.3.2.7. Front Windshield Wiper Command
Request to control front windshield wiper
Values

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks
  This command is valid when front windshield wiper mode on a combination switch is "OFF" or "AUTO".
  Driver input overrides this command.
  Windshieldwiper mode is kept while receiving a command.
  Wiping speed of intermittent mode is fixed.

3.3.2.8. Rear Windshield Wiper Command
Request to control rear windshield wiper
Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks
  Driver input overrides this command
  Windshieldwiper mode is kept while receiving a command.
  Wiping speed of intermittent mode is fixed.

3.3.2.9. HVAC (1st Row) Operation Command
Request to start/stop 1st row air conditioning control
Values

| Value | Description | Remarks |
|---|---|---|
| 0 | No request | |
| 1 | ON | |
| 2 | OFF | |

Remarks
  N/A

3.3.2.10. HVAC (2nd Row) Operation Command
Request to start/stop 2nd row air conditioning control

| Value | Description | Remarks |
|---|---|---|
| 0 | No request | |
| 1 | ON | |
| 2 | OFF | |

Remarks
  N/A

3.3.2.11. Target Temperature (1st Left) Command
Request to set target temperature in front left area
Values

| Value | Description | Remarks |
|---|---|---|
| 0 | No request | |
| 60 to 85 [unit: ° F.] (by 1.0° F.) | Target temperature | |

Remarks
  In case ° C. is used in VP, value should be set as ° C.

3.3.2.12. Target Temperature (1st Right) Command
Request to set target temperature in front right area
Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.13. Target Temperature (2nd Left) Command

Request to set target temperature in rear left area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.14. Target Temperature (2nd Right) Command

Request to set target temperature in rear right area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.15. HVAC Fan (1st Row) Command

Request to set fan level of front AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (1st row) operation command=OFF."

If you would like to turn the fan level to AUTO, you should transmit "HVAC (1st row) operation command=ON."

3.3.2.16. HVAC Fan (2nd Row) Command

Request to set fan level of rear AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air Outlet (1st Row) Command

Request to set 1st row air outlet mode

Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks

N/A

3.3.2.18. Air Outlet (2nd Row) Command

Request to set 2nd row air outlet mode

Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks

N/A

3.3.2.19. Air Recirculation Command

Request to set air recirculation mode

Values

| Value | Description | Remarks |
|---|---|---|
| 0 | No request | |
| 1 | ON | |
| 2 | OFF | |

Remarks

N/A

3.3.2.20. AC Mode Command

Request to set AC mode

Values

| Value | Description | Remarks |
|---|---|---|
| 0 | No request | |
| 1 | ON | |
| 2 | OFF | |

Remarks

N/A

3.3.2.21. Turnsignal Status

Values

| Value | Description | Remarks |
|---|---|---|
| 0 | OFF | |
| 1 | Left | |
| 2 | Right | |
| 3 | Invalid | |

Remarks

N/A 3.3.2.22. Headlight Status

Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

Remarks

N/A 3.3.2.23. Hazardlight Status

| Value | Description | Remarks |
|---|---|---|
| 0 | OFF | |
| 1 | Hazard | |
| 2 | Reserved | |
| 3 | Invalid | |

Remarks

N/A 3.3.2.24. Horn Status

Values

| Value | Description | Remarks |
|---|---|---|
| 0 | OFF | |
| 1 | ON | |
| 2 | Reserved | |
| 3 | Invalid | |

Remarks

In the case that 3.3.2.4 the Horn Pattern Command is active, the Horn status is “1” even if there are OFF periods in some patterns.

3.3.2.25. Front Windshield Wiper Status

Values

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks

N/A 3.3.2.26. Rear Windshield Wiper Status

Values

| Value | Description | Remarks |
|---|---|---|
| 0 | OFF | |
| 1 | Lo | |
| 2 | Reserved | |
| 3 | INT | |
| 4-5 | Reserved | |
| 6 | Fail | |
| 7 | Invalid | |

Remarks

N/A 3.3.2.27. HVAC (1st Row) Status

Values

| Value | Description | Remarks |
|---|---|---|
| 0 | OFF | |
| 1 | ON | |

Remarks

N/A 3.3.2.28. HVAC (2nd Row) Status

Values

| Value | Description | Remarks |
|---|---|---|
| 0 | OFF | |
| 1 | ON | |

Remarks

N/A 3.3.2.29. Target Temperature (1st Left) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.30. Target Temperature (1st Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.31. Target Temperature (2nd Left) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.32. Target Temperature (2nd Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks

In case ° C. is used in VP, value should be set as ° C.

3.3.2.33. HVAC Fan (1st Row) Status

Values

| Value | Description | Remarks |
|---|---|---|
| 0 | OFF | |
| 1 to 7 | Fan Level | |
| 8 | Undefined | |

Remarks

N/A 3.3.2.34. HVAC Fan (2nd Row) Status

Values

| Value | Description | Remarks |
|---|---|---|
| 0 | OFF | |
| 1 to 7 | Fan Level | |
| 8 | Undefined | |

Remarks

N/A 3.3.2.35. Air Outlet (1st Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks

N/A 3.3.2.36. Air Outlet (2nd Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks

N/A 3.3.2.37. Air Recirculation Status

Values

| Value | Description | Remarks |
|---|---|---|
| 0 | OFF | |
| 1 | ON | |

Remarks

N/A 3.3.2.38. AC Mode Status

Values

| Value | Description | Remarks |
|---|---|---|
| 0 | OFF | |
| 1 | ON | |

Remarks

N/A 3.3.2.39. Seat Occupancy (1st Right) Status

Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat Belt (1st Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A 3.3.2.41. Seat Belt (1st Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks
  N/A 3.3.2.42. Seat Belt (2nd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.43. Seat Belt (2nd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.44. Seat Belt (3rd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.45. Seat Belt (3rd Center) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure 3.3.2.46. Seat Belt (3rd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure 3.4. APIs for Power Control
3.4.1. API List for Power Control
3.4.1.1. Inputs

TABLE 8

Input APIs for Power control

| Signal Name | Description | Redundancy |
|---|---|---|
| Power mode command | Command to control the power mode of VP | N/A |

3.4.1.2. Outputs

TABLE 9

Output APIs for Power control

| Signal Name | Description | Redundancy |
|---|---|---|
| Power mode status | Status of the current power mode of VP | N/A |

3.4.2. Details of Each API for Power Control
3.4.2.1. Power Mode Command
  Request to control power mode
Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Figure 13:
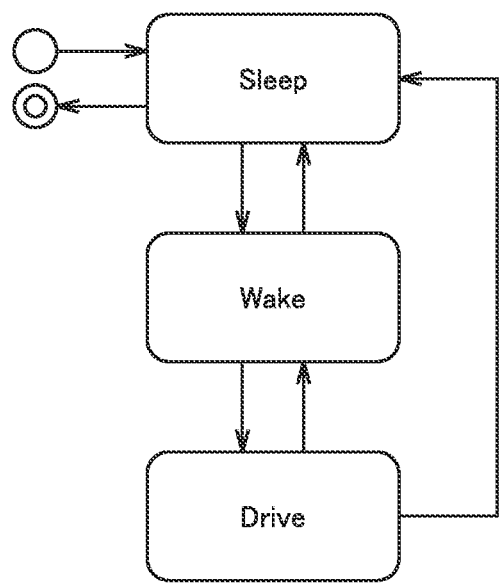
FIG. 13 is a state machine diagram of the power mode.

Remarks
  The state machine diagram of the power modes is shown in FIG. 13.
[Sleep]
  Vehicle power off condition. In this mode, the main battery does not supply power to each system, and neither VCIB nor other VP ECUs are activated.
[Wake]
  VCIB is awake by the auxiliary battery. In this mode, ECUs other than VCIB are not awake except for some of the body electrical ECUs.
[Driving Mode]
  Vehicle power on condition. In this mode, the main battery supplies power to the whole VP and all the VP ECUs including VCIB are awake.

3.4.2.2. Power Mode Status
Values

| Value | Description | Remarks |
|---|---|---|
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks
VCIB will transmit [Sleep] as Power Mode Status continuously for 3000 [ms] after executing the sleep sequence. And then, VCIB will shut down.
ADS should stop transmitting signals to VCIB while VCIB is transmitting [Sleep].

3.5. APIs for Failure Notification
3.5.1. API List for Failure Notification
3.5.1.1. Inputs

TABLE 10

Input APIs for Failure Notification

| Signal Name | Description | Redundancy |
|---|---|---|
| N/A | N/A | N/A |

3.5.1.2. Outputs

TABLE 11

Output APIs for Failure Notification

| Signal Name | Description | Redundancy |
|---|---|---|
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of each API for Failure Notification
3.5.2.1. Request for ADS Operation
Values

| Value | Description | Remarks |
|---|---|---|
| 0 | No request | |
| 1 | Need maintenance | |
| 2 | Need to be back to garage | |
| 3 | Need to stop immediately | |
| Others | Reserved | |

Remarks
This signal shows a behavior which the ADS is expected to do according to a failure which happened in the VP.

3.5.2.2. Impact Detection Signal

| Value | Description | Remarks |
|---|---|---|
| 0 | Normal | |
| 5 | Crash detection with activated airbag | |
| 6 | Crash detection with shut off high voltage circuit | |
| 7 | Invalid value | |
| Others | Reserved | |

Remarks
When the event of crash detection is generated, the signal is transmitted 50 consecutive times every 100 [ms]. If the crash detection state changes before the signal transmission is completed, the high signal of priority is transmitted.
Priority: crash detection>normal
Transmits for 5 s regardless of ordinary response at crash, because the vehicle breakdown judgment system shall be sent a voltage OFF request for 5 s or less after crash in HV vehicle.
Transmission interval is 100 ms within fuel cutoff motion delay allowance time (1 s) so that data can be transmitted more than 5 times.
In this case, an instantaneous power interruption is taken into account.

3.5.2.3. Performance Deterioration of Brake System
Values

| Value | Description | Remarks |
|---|---|---|
| 0 | Normal | — |
| 1 | Deterioration detected | — |

Remarks
N/A 3.5.2.4. Performance Deterioration of Propulsion System
Values

| Value | Description | Remarks |
|---|---|---|
| 0 | Normal | — |
| 1 | Deterioration detected | — |

Remarks
N/A 3.5.2.5. Performance Deterioration of Shift Control System
Values

| Value | Description | Remarks |
|---|---|---|
| 0 | Normal | — |
| 1 | Deterioration detected | — |

Remarks
N/A 3.5.2.6. Performance Deterioration of Immobilization System
Values

| Value | Description | Remarks |
|---|---|---|
| 0 | Normal | — |
| 1 | Deterioration detected | — |

Remarks
N/A 3.5.2.7. Performance Deterioration of Steering System
Values

| Value | Description | Remarks |
|---|---|---|
| 0 | Normal | — |
| 1 | Deterioration detected | — |

3.5.2.8. Performance Deterioration of Power Supply System

Values

| Value | Description | Remarks |
|---|---|---|
| 0 | Normal | — |
| 1 | Deterioration detected | — |

Remarks

N/A

3.5.2.9. Performance Deterioration of Communication System

Values

| Value | Description | Remarks |
|---|---|---|
| 0 | Normal | — |
| 1 | Deterioration detected | — |

Remarks

N/A

3.6. APIs for Security
3.6.1. API List for Security
3.6.1.1. Inputs

TABLE 12

| Input APIs for Security ||| |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security ||| |
|---|---|---|
| Signal Name | Description | Redundancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security

3.6.2.1. Door Lock (Front) Command, Door Lock (Rear) Command

Values

| Value | Description | Remarks |
|---|---|---|
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central Door Lock Command

Request to control all doors' lock

Values

| Value | Description | Remarks |
|---|---|---|
| 0 | No Request | |
| 1 | Lock (all) | |
| 2 | Unlock (all) | |
| 3 | Reserved | |

Remarks

N/A

3.6.2.3. Device Authentication Signature the 1st Word, Device Authentication Signature the 2nd Word, Device Authentication Signature the 3rd Word, Device Authentication Signature the 4th Word, Device Authentication Seed the 1st Word, Device Authentication Seed the 2nd Word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.5. Door Lock (1st Right) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.6. Door Lock (2nd Left) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.7. Door Lock (2nd Right) Status

Values

| Value | Description | Remarks |
|---|---|---|
| 0 | Reserved | |
| 1 | Locked | |
| 2 | Unlocked | |
| 3 | Invalid | |

Remarks

N/A

3.6.2.8. Door Lock Status of all Doors

Values

| Value | Description | Remarks |
|---|---|---|
| 0 | Reserved | |
| 1 | All Locked | |
| 2 | Anything Unlocked | |
| 3 | Invalid | |

Remarks

In case any doors are unlocked, "Anything Unlocked."

In case all doors are locked, "All Locked."

3.6.2.9. Alarm System Status

Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks

N/A

3.6.2.9.1. Trip Counter

This counter is incremented in a unit of trips by the Freshness Value management master ECU.

Values
 0-FFFFh
Remarks
 This value is used to create a Freshness value.
 For details, please refer to the other material [the specification of Toyota's MAC module].
3.6.2.9.2. Reset Counter
 This counter is incremented periodically by the Freshness Value management master ECU.
Values
 0-FFFFFh
Remarks
 This value is used to create a Freshness value.
 For details, please refer to the other material [the specification of Toyota's MAC module].
3.6.2.10. 1st Left Door Open Status
 Status of the current 1st-left door open/close of the vehicle platform
Values

| Value | Description | Remarks |
|---|---|---|
| 0 | Reserved | |
| 1 | Open | |
| 2 | Closes | |
| 3 | Invalid | |

Remarks
 N/A
3.6.2.11. 1st Right Door Open Status
 Status of the current 1st-right door open/close
Values

| Value | Description | Remarks |
|---|---|---|
| 0 | Reserved | |
| 1 | Open | |
| 2 | Close | |
| 3 | Invalid | |

Remarks
 N/A
3.6.2.12. 2nd Left Door Open Status
 Status of the current 2nd-left door open/close
Values

| Value | Description | Remarks |
|---|---|---|
| 0 | Reserved | |
| 1 | Open | |
| 2 | Close | |
| 3 | Invalid | |

Remarks
 N/A
3.6.2.13. 2nd Right Door Open Status
 Status of the current 2nd-right door open/close
Values

| Value | Description | Remarks |
|---|---|---|
| 0 | Reserved | |
| 1 | Open | |
| 2 | Close | |
| 3 | Invalid | |

Remarks
 N/A
3.6.2.14. Trunk Status
 Status of the current trunk door open/close
Values

| Value | Description | Remarks |
|---|---|---|
| 0 | Reserved | |
| 1 | Open | |
| 2 | Close | |
| 3 | Invalid | |

Remarks
 N/A
3.6.2.15. Hood Open Status
 Status of the current hood open/close
Values

| Value | Description | Remarks |
|---|---|---|
| 0 | Reserved | |
| 1 | Open | |
| 2 | Close | |
| 3 | Invalid | |

Remarks
 N/A

4. API Guides to Control Toyota Vehicles

This section shows in detail the way of using APIs for Toyota vehicles.
4.1. APIs for Vehicle Motion Control
4.1.1. API List for Vehicle Motion Control
 Input and output APIs for vehicle motion control are shown in Table 14 and Table 15, respectively. Usage guides of some APIs are presented in the following sections as indicated in each table.
4.1.1.1. Inputs

TABLE 14

Input APIs for Vehicle Motion Control

| Signal Name | Description | Redundancy | Usage Guide |
|---|---|---|---|
| Propulsion Direction Command | Request for shift change from/to forward (D range) to/from back (R range) | N/A | 4.1.2.1 |
| Immobilization Command | Request for turning on/off WheelLock | Applied | 4.1.2.2 |

TABLE 14-continued

Input APIs for Vehicle Motion Control

| Signal Name | Description | Redundancy | Usage Guide |
|---|---|---|---|
| Standstill Command | Request for keeping on/off stationary | Applied | 4.1.2.3 |
| Acceleration Command | Request for acceleration/deceleration | Applied | 4.1.2.1<br>4.1.2.2<br>4.1.2.3<br>4.1.2.4 |
| Front Wheel Steer Angle Command | Request for front wheel steer angle | Applied | 4.1.2.5 |
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK

4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2<br>4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1<br>4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API Guides in Details for Vehicle Motion Control
4.1.2.1. Propulsion Direction Command
Please refer to 3.2.2.1 for value and remarks in detail.

Figure 14:
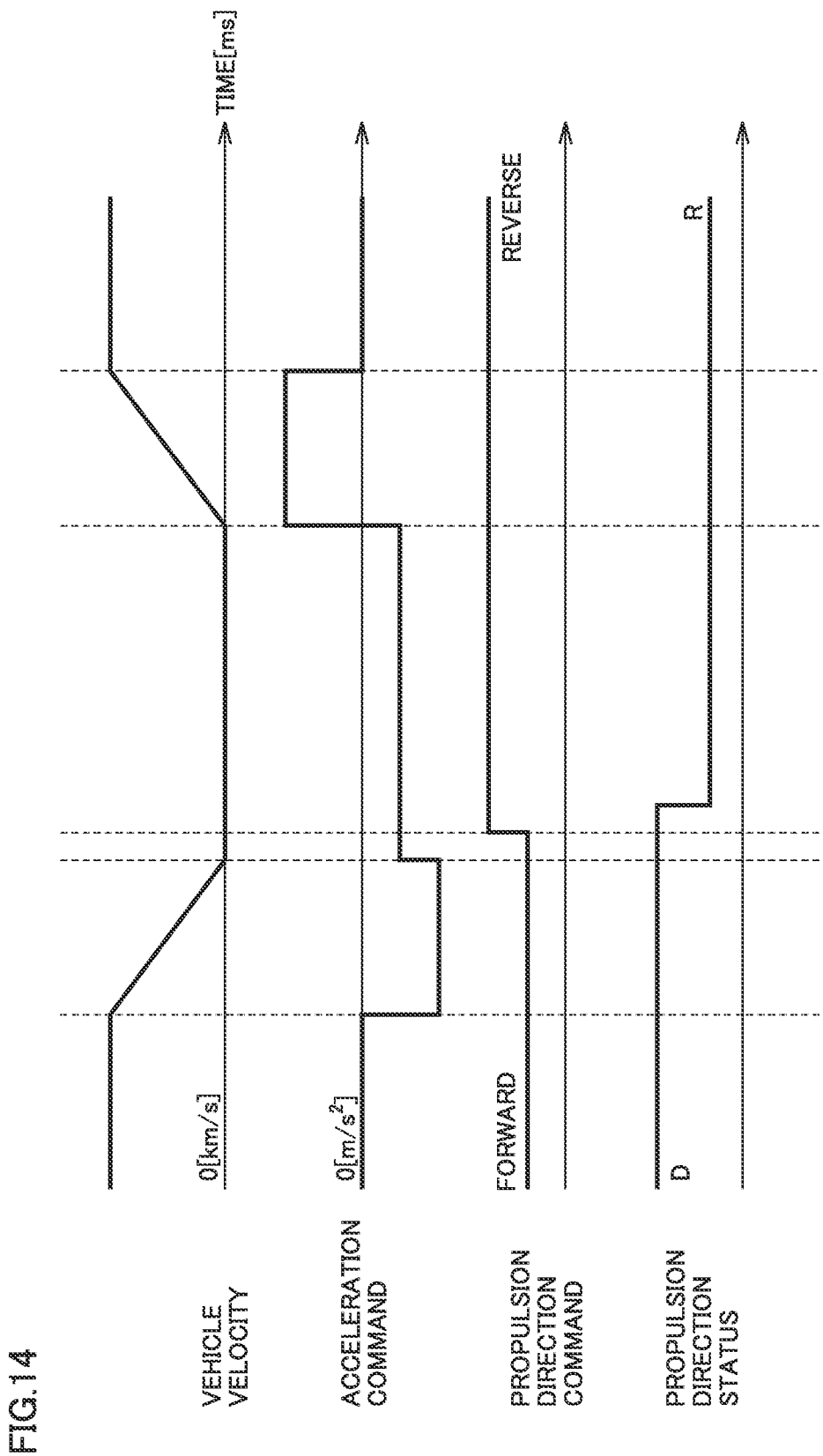
FIG. 14 is a diagram showing details of shift change sequences.

FIG. 14 shows shift change sequences in detail.

First deceleration is requested by Acceleration Command and the vehicle is stopped. When Traveling direction is set to "standstill", any shift position can be requested by Propulsion Direction Command. (In FIG. 14, "D"→"R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command
Please refer to 3.2.2.2 for value and remarks in detail.

Figure 15:
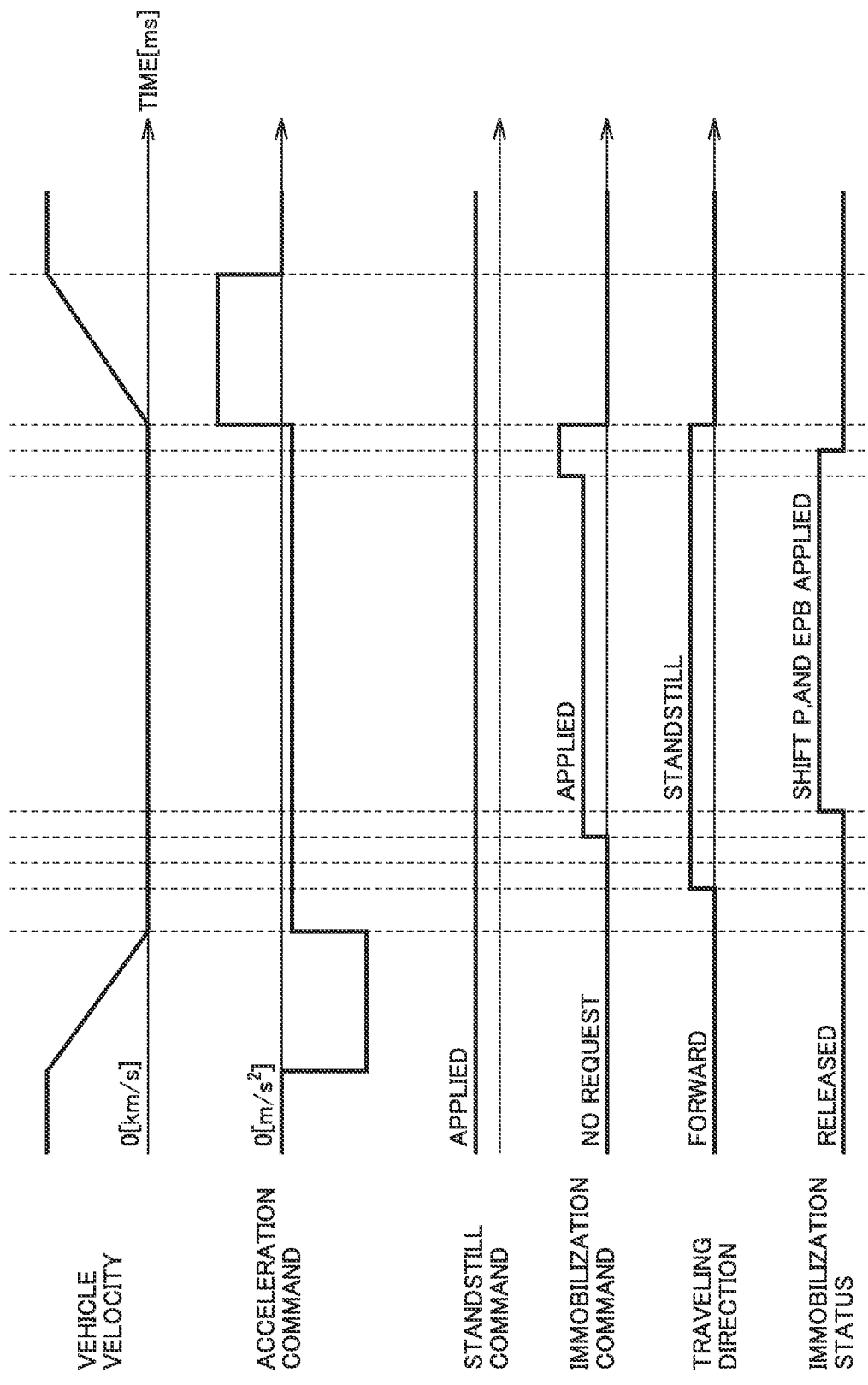
FIG. 15 is a diagram showing immobilization sequences.

FIG. 15 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command
Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied" On the other hand, in case where Standstill Command is set as "Released", brakehold function is deactivated.

Figure 16:
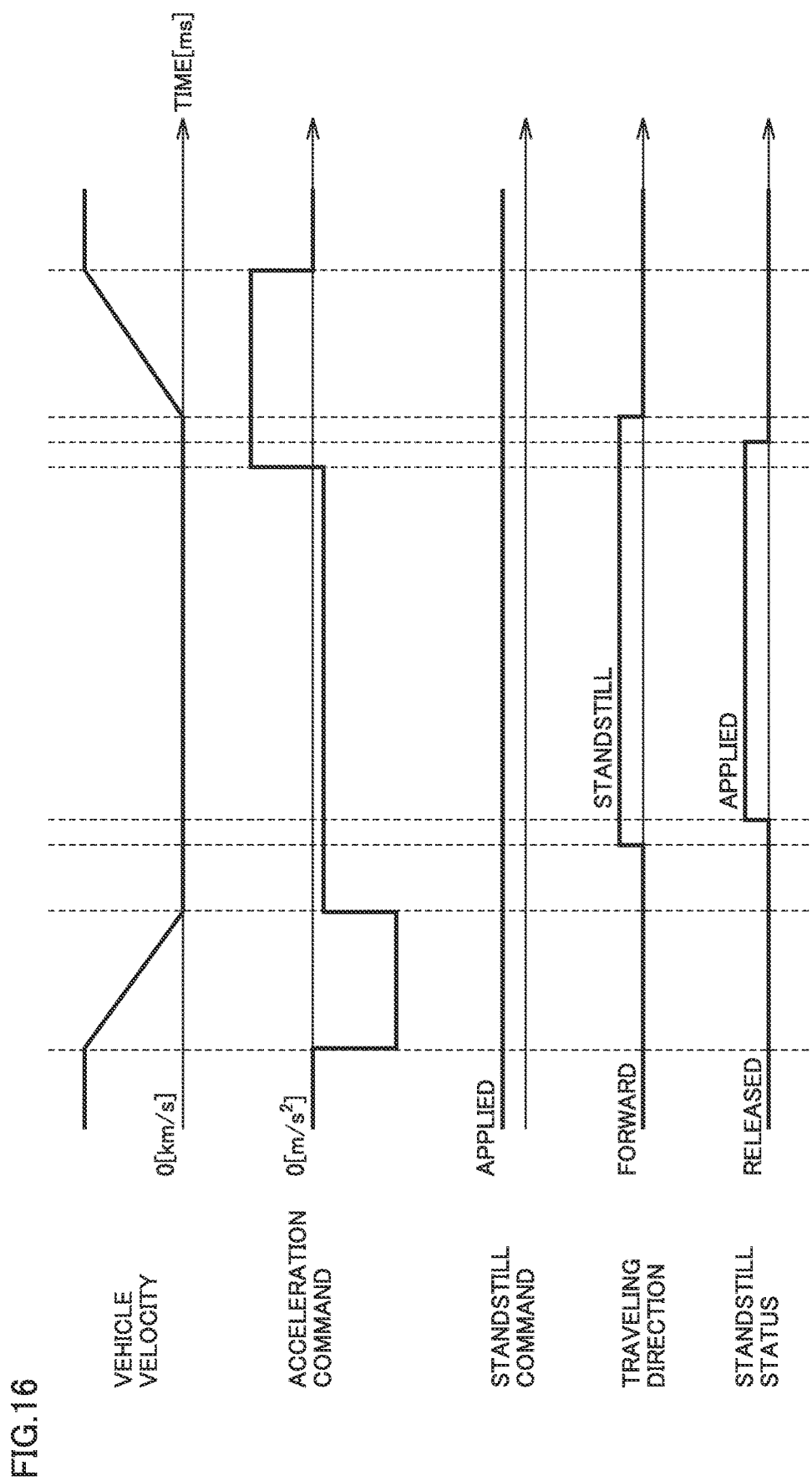
FIG. 16 is a diagram showing standstill sequences.

FIG. 16 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command
Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command
Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1 [rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

Figure 17:
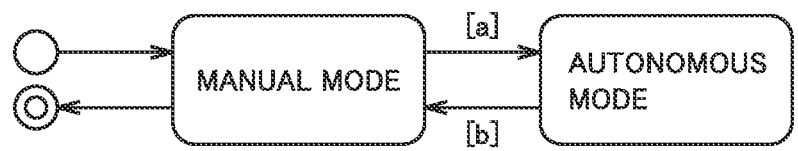
FIG. 17 is a state machine diagram of an autonomy state.

4.1.2.6. Vehicle Mode Command
The state machine of mode transition for Autono-MaaS vehicle is shown in FIG. 17.

The explanation of each state is shown as follows.

| State | Description |
|---|---|
| Manual | A vehicle begins with this state and is under a control of a human driver. ADK cannot give any controls (except some commands) to VP. Power mode status and Vehicle mode state are in the followings: Power mode status = Wake or Drive Vehicle mode state = Manual Mode |
| Autonomy | ADK can communicate to VP after authentication is successful. VP is under the control of the ADK as a result of being issued "Request for Autonomy." Power mode status and Vehicle mode state are in the followings: Power mode status = Drive Vehicle mode state = Autonomous Mode |

The explanation of each transition is shown as follows.

| Transition | Conditions |
|---|---|
| a | When the following conditions are established, the mode will be transitioned from Manual to Autonomy: The ADK is authenticated, Power mode status = Drive, Readiness for autonomization = Ready For Autonomy Vehicle Mode Command = Request For Autonomy. |
| b | When the following conditions are established, the mode will be transitioned from Autonomy to Manual: Vehicle Mode Command = Deactivation Request. |

4.2. APIs for BODY Control
4.2.1. API List for BODY Control

4.2.1.1. Inputs

TABLE 16

| Input APIs for BODY Control | | | |
|---|---|---|---|
| Signal Name | Description | Redundancy | Usage Guide |
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

| Output APIs for BODY Control | | | |
|---|---|---|---|
| Signal Name | Description | Redundancy | Usage Guide |
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |

TABLE 17-continued

Output APIs for BODY Control

| Signal Name | Description | Redundancy | Usage Guide |
|---|---|---|---|
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control
4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification
4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | — | Applied | — |
| Performance deterioration of Power supply system | — | Applied | — |
| Performance deterioration of Communication system | — | Applied | — |

4.5. APIs for Security
4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |

TABLE 22-continued

Input APIs for Security

| Signal Name | Description | Redundancy | Usage Guide |
|---|---|---|---|
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security 4.5.2.1. Device Authentication Protocol Device authentication is applied when the VCIB is activated from "Sleep" mode.

After the authentication succeeds, the VCIB can start to communicate with ADK.

Figure 18:
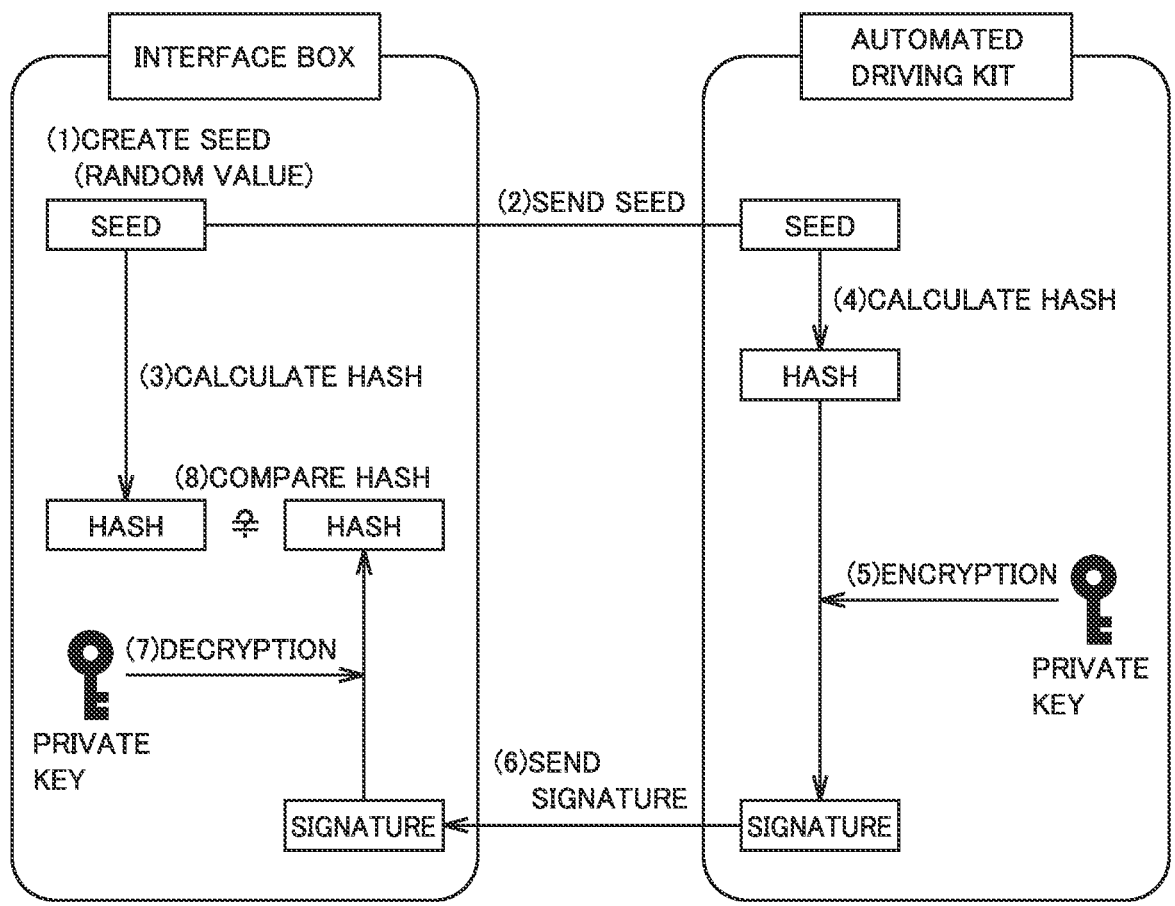
FIG. 18 is a diagram showing an authentication process.

Authentication process is as shown in FIG. 18 Authentication Process.

Authentication Specification

| Item | Specification | Note |
| --- | --- | --- |
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle platform on which an autonomous driving system is mountable, the vehicle platform comprising:
a vehicle; and
a vehicle control interface box that interfaces between the vehicle and the autonomous driving system, wherein
the vehicle control interface box includes a processor and a memory in which a program executed by the processor is stored,
the processor
receives a power mode command from the autonomous driving system, the power mode command includes requesting control of a power mode of the vehicle platform,
the vehicle includes
a main battery;
an auxiliary battery; and
a plurality of electronic control units, and
the power mode includes
a first mode in which the vehicle control interface box and the plurality of electronic control units are not awake,
a second mode in which the vehicle control interface box and a portion of electronic control units among the plurality of electronic control units are awake by a power feed from the auxiliary battery and without a power feed from the main battery, and wherein the vehicle is unable to travel,
a third mode in which the vehicle control interface box and a portion of the electronic control units larger than the portion in the second mode among the plurality of electronic control units are awake by the power feed from the auxiliary battery without the power feed from the main battery, and wherein the vehicle is unable to travel, and
a fourth mode in which the vehicle control interface box and the plurality of electronic control units are awake, and wherein the vehicle is able to travel.

2. The vehicle platform according to claim 1, wherein the power mode is such that
from the first mode, transition to the second mode can be made,
from the second mode, transition to any one of the first mode, the third mode, and the fourth mode can be made,
from the third mode, transition to any one of the first mode, the second mode, and the fourth mode can be made, and
from the fourth mode, transition to any one of the first mode and the second mode can be made.

3. The vehicle platform according to claim 2, wherein the processor ignores a request for transition from the fourth mode to the third mode.

4. The vehicle platform according to claim 1, wherein the processor transmits a power mode status indicating a status of the power mode of the vehicle platform to the autonomous driving system.

5. An autonomous driving system configured as being mountable on a vehicle platform, the vehicle platform including a vehicle and a vehicle control interface box that interfaces between the vehicle and the autonomous driving system, the autonomous driving system comprising:
a compute assembly; and
a communication module that communicates with the vehicle control interface box, wherein
the compute assembly is programmed to transmit a power mode command that requests control of a power mode of the vehicle platform to the vehicle control interface box through the communication module, the vehicle control interface box receiving the power mode command, and
the vehicle includes
a main battery;
an auxiliary battery; and
a plurality of electronic control units, and
the power mode includes
a first mode in which the vehicle control interface box and the plurality of electronic control units are not awake,
a second mode in which the vehicle control interface box and a portion of electronic control units among the plurality of electronic control units are awake by a power feed from the auxiliary battery and without a power feed from the main battery, and wherein the vehicle is unable to travel,
a third mode in which the vehicle control interface box and a portion of the electronic control units larger than the portion in the second mode among the plurality of electronic control units are awake by power feed from the auxiliary battery without the power feed from the main battery, and wherein the vehicle is unable to travel, and
a fourth mode in which the vehicle control interface box and the plurality of electronic control units are awake, and the vehicle is able to travel.

6. The autonomous driving system according to claim 5, wherein
the power mode is such that
from the first mode, transition to the second mode can be made,
from the second mode, transition to any one of the first mode, the third mode, and the fourth mode can be made,
from the third mode, transition to any one of the first mode, the second mode, and the fourth mode can be made, and from the fourth mode, transition to any one of the first mode and the second mode can be made.

7. The autonomous driving system according to claim 5, wherein
the compute assembly is further programmed to receive a power mode status indicating a status of the power mode of the vehicle platform from the vehicle control interface box through the communication module.

8. A vehicle control interface box that interfaces between a vehicle platform and an autonomous driving system mounted on the vehicle platform, the vehicle control interface box comprising:
a processor; and
a memory in which a program executed by the processor is stored, wherein
the processor
receives, from the autonomous driving system, a power mode command that includes a request control of a power mode of the vehicle platform from the autonomous driving system in accordance with the program,
the vehicle platform includes a vehicle,
the vehicle includes
a main battery;
an auxiliary battery; and
a plurality of electronic control units, and
the power mode includes
a first mode in which the vehicle control interface box and the plurality of electronic control units are not awake,
a second mode in which the vehicle control interface box and a portion of electronic control units among the plurality of electronic control units are awake by a power feed from the auxiliary battery and without power feed from the main battery, and wherein the vehicle is unable to travel,
a third mode in which the vehicle control interface box and a portion of electronic control units larger than the portion in the second mode among the plurality of electronic control units are awake by the power feed from the auxiliary battery and without the power feed from the main battery, and wherein the vehicle is unable to travel, and
a fourth mode in which the vehicle control interface box and the plurality of electronic control units are awake, and the vehicle is able to travel.

9. The vehicle control interface box according to claim 8, wherein
the power mode is such that
from the first mode, transition to the second mode can be made,
from the second mode, transition to any one of the first mode, the third mode, and the fourth mode can be made,
from the third mode, transition to any one of the first mode, the second mode, and the fourth mode can be made, and
from the fourth mode, transition to any one of the first mode and the second mode can be made.

10. The vehicle control interface box according to claim 9, wherein
the processor ignores a request for transition from the fourth mode to the third mode.

11. The vehicle control interface box according to claim 8, wherein
the processor further transmits a power mode status indicating a status of the power mode of the vehicle platform to the autonomous driving system.

* * * * *